United States Patent [19]
Masutani

[11] Patent Number: 6,008,878
[45] Date of Patent: Dec. 28, 1999

[54] PHOTOGRAPHIC PROCESSING APPARATUS

[75] Inventor: Hironori Masutani, Wakayama, Japan

[73] Assignee: Noritsu Koki Co., Ltd., Wakayama-ken, Japan

[21] Appl. No.: 08/923,439

[22] Filed: Sep. 4, 1997

[30] Foreign Application Priority Data

Sep. 10, 1996 [JP] Japan ................................. 8-238821
Sep. 17, 1996 [JP] Japan ................................. 8-244955

[51] Int. Cl.⁶ ................................................ G03B 27/32
[52] U.S. Cl. ................................ 355/40; 355/41; 355/77; 355/27; 235/375; 235/376
[58] Field of Search ............................. 355/40, 41, 77; 235/375, 376

[56] References Cited

U.S. PATENT DOCUMENTS

| | | | |
|---|---|---|---|
| 3,751,874 | 8/1973 | Schultes et al. | 53/59 |
| 4,933,711 | 6/1990 | Gundmundson et al. | 355/40 |
| 5,021,820 | 6/1991 | Robison et al. | 355/40 |
| 5,159,385 | 10/1992 | Imamura | 355/40 |
| 5,264,683 | 11/1993 | Yoshikawa | 235/375 |
| 5,715,034 | 2/1998 | Yamamoto | 355/40 |
| 5,847,809 | 12/1998 | Masutani | 355/27 |
| 5,847,810 | 12/1998 | Masutani | 355/27 |
| 5,910,835 | 6/1999 | Masutani | 355/27 |

FOREIGN PATENT DOCUMENTS

| | | | |
|---|---|---|---|
| 458747A1 | 11/1991 | European Pat. Off. | G03D 15/00 |
| 475278A2 | 3/1992 | European Pat. Off. | G03B 27/73 |
| 643622 | 2/1994 | Japan | G03D 15/00 |

*Primary Examiner*—D. Rutledger
*Attorney, Agent, or Firm*—Fulbright & Jaworski, LLP

[57] ABSTRACT

A photographic processing apparatus having a checking function to collating negative films and prints. The photographic processing apparatus includes a trouble detecting device 5j for detecting a trouble of collating disagreement occurring during processing of the negative films 2 and printing paper 3 to affect collation between the negative films 2 and prints 3 in one unit, and a notifying device 180 operable in response to trouble information provided by the trouble detecting device 5j for notifying that finished products transported by a collating transport device 70 have the trouble of collating disagreement.

10 Claims, 19 Drawing Sheets

PHOTOGRAPHIC PROCESSING APPARATUS

BACKGROUND OF THE INVENTION

1. Field of the Invention

This invention relates to a photographic processing apparatus having an exposing section for printing images of negative films received from a negative film feeder on printing paper, a negative film outlet for discharging the negative films used in the exposing section, a developing section for developing the printing paper printed, a print outlet for cutting the printing paper developed to predetermined lengths, and discharging the cut printing paper as prints, and a collating transport mechanism for receiving the negative films discharged unit by unit from the negative film outlet and the prints discharged unit by unit from the print outlet and having the images of the negative films in corresponding units, and combining and transporting the negative films and prints as finished products.

2. Description of the Related Art

In the photographic processing apparatus noted above, a combination of negative films and prints processed as one unit usually is based on a single length of negative film or one set of piece negatives (cut negative films each having four or six frames) ordered by a customer. This one unit is called on order also. When the same customer orders printing of several negative films or several sets of piece negatives at the same time, they are processed as separate orders. A photographic processing apparatus for collating piece negatives (one long negative film ultimately being cut to piece negatives of a predetermined length) and prints in one order or unit and automatically putting the negatives and prints in a product packet is known from Japanese Patent Publication Kokai No. H6-43622, for example. This photographic processing apparatus includes a stage of collating piece negatives and prints, in which the piece negatives in one unit inserted into negative sheets after an exposing process are put into a print packet printed with an ID number of these piece negatives. The ID number on the print packet is compared with ID numbers of prints transported unit by unit by a sorter. The prints in one unit having the same ID number are put into this print packet to be combined with the piece negatives having this ID number.

With this collating system, where the piece negatives and prints transported successively have disagreeing ID numbers, it is necessary to check one ID number after another of the piece negatives and prints. Thus, a disagreement in ID number involves a troublesome recovery operation. Even where such disagreement occurs with piece negatives and prints in only one order, the other, agreeing piece negatives and prints also must be checked during the recovery operation. This results in a substantial reduction in the operating rate of the photographic processing apparatus.

SUMMARY OF THE INVENTION

The object of this invention is to provide a photographic processing apparatus which overcomes the disadvantages of the prior art noted above, and which has a collating function facilitating a recovery operation in the event of a disagreement between negative films and prints.

The above object is fulfilled, according to this invention, by a photographic processing apparatus having an exposing section for printing images of negative films received from a negative film feeder on printing paper, a negative film outlet for discharging the negative films used in the exposing section, a developing section for developing the printing paper printed, a print outlet for cutting the printing paper developed to predetermined lengths, and discharging the cut printing paper as prints, and collating transport means for receiving the negative films discharged unit by unit from the negative film outlet and the prints discharged unit by unit from the print outlet and having the images of the negative films in corresponding units, and combining and transporting the negative films and prints as finished products, the photographic processing apparatus comprising trouble detecting means for detecting a trouble of collating disagreement occurring during processing of the negative films and the printing paper to affect collation between the negative films and the prints in one unit, and notifying means operable in response to trouble information provided by the trouble detecting means for notifying that the finished products transported by the collating transport means have the trouble of collating disagreement.

In the above construction, the trouble detecting means detects, as a trouble of collating disagreement, a trouble occurring with the process of the negative films or printing paper to result in a collating disagreement between the negative films and prints in one unit in the transport stage by the collating transport means. It is then possible to indicate the collating disagreement of finished products, i.e. the negative films and prints, transported by the collating transport means. As a result, the operator can readily recognize the disagreeing negative films and prints transported by the collating transport means which combines and collates negative films and prints unit by unit. Only the disagreeing negative films and prints may be taken out to carry out a recovery operation. The other finished products in agreement need not be checked. That is, even if a collating disagreement should arise, a recovery operation could be effected easily and promptly, thereby improving the operating rate of this photographic processing apparatus.

In a preferred embodiment this invention, the collating transport means is in the form of a tray conveyer, and the notifying means is provided each tray carrying the finished products. According to this construction, when disagreeing finished products, i.e. negative films and prints, are loaded from the outlets into a tray, the notifying means of this tray indicates that the finished products currently carried cannot be collated. Then, the operator removes the finished products in disagreement from the tray, and carries out a recovery operation. The operator only has to pay attention to the notifying means disposed on the tray, which facilitates the collating operation.

The notifying means may be constructed to appeal to the visual or auditory sense of man. It may be effective to use a device for displaying a colored mark, e.g. red. Such a collating disagreement mark is displayed more advantageously by a mechanical switching device than by an electrical lighting device since the latter requires electrical wiring.

Preferably, each tray includes a film holder for storing the negative films, and a print holder for storing the prints. In this case, the prints having the images of the negative films stored in the film holder are stored in the print holder of the same tray. This facilitates an operation to collect collated prints and negative films and put them into one product packet. With the tray for which the notifying means indicates a collating disagreement, the images of the negative films and the images on the prints stored therein (though nothing could be stored owing to a trouble) are out of agreement. The negative films and prints are removed from this tray for a recovery operation. The negative films and prints in the other trays may be put into product packets for shipment.

The trouble detecting means can take various forms for detecting a trouble resulting in a collating disagreement when the negative films and print are finally combined in the collating transport means. The negative films and printing paper are continuously processed in relation to each other in the photographic processing apparatus. On the assumption that no collating disagreement occurs as long as the apparatus operates continuously and normally, the trouble detecting means may be constructed to regard a trouble of collating disagreement as having occurred when either of the continuous processes of the negative films and printing paper is disrupted. When the negative film or printing paper becomes jammed in transport, it is necessary to remove the negative film or printing paper from the transport course. The negative film in particular tends to become jammed in a transport stage for reading the images, a stage of cutting to piece negatives, and a stage of insertion into negative sheet. Then, the continuous process is disrupted to remove the negative film. In this case, a collating disagreement will positively take place in the collating transport means. The trouble detecting means detects this trouble, and causes the notifying means of the tray corresponding to this negative film to indicate the collating disagreement.

Further, checking done when reading the images before the printing process may show that all the images on the negative film are unfit for normal printing. Then, the frame images are not printed. This results in a disagreement between the images of the negative film and the prints in the collating transport means. It is proposed to construct the trouble detecting means to detect such a case as a trouble of collating disagreement.

It is an important aspect of this invention to enable a smooth shipping operation of finished and collated products. For this purpose, the trouble detecting means detects a trouble occurring in the entire processing of the photographic processing apparatus starting with the process of loading the negative films and printing paper. Such a trouble results in a collating disagreement between the negative films and prints finally combined in the collating transport means. The notifying means indicates the collating disagreement between the negative films and prints transported.

Where the tray conveyer having a storage capacity is employed as the collating transport means, it is proposed to employ as the trouble detecting means, delay anticipating means for anticipating a delay in arrival of a tray transported from a negative film intake station where the negative films are transferred from the negative film outlet to the tray, to a print intake station where the prints are transferred from the print outlet to the tray. In this case, feeding of the printing paper to the developing section is discontinued when the delay anticipating means anticipates a delay in arrival of the tray at the print intake station.

According to this construction, when a delay in arrival of the tray at the print intake station is expected, the printing paper is stopped being fed to the developing section beforehand. Even when a trouble occurs with the conveyer mechanism resulting in no tray arriving at the print intake station for loading the prints, the transport line through and downstream of the developing section may be stopped since the printing paper has already been stopped being fed to the developing section. This solves the problem of prints overflowing the print intake station and mixing with prints in a preceding order.

In a preferred embodiment, each tray includes a film holder for storing the negative films, and a print holder for storing the prints. The delay anticipating means anticipates the delay in arrival when the number of trays present between the negative film intake station and the print intake station reaches a predetermined number.

The negative films having the frame images printed on the printing paper are loaded into the film holder of a tray at the negative film intake station. The prints with the corresponding frame images are loaded into the print holder of this tray at the print intake station. Thus, the number of trays present between the negative film intake station and print intake station approximately corresponds to the number of units, or orders, of the frame images formed on printing paper extending from the developing section to the print outlet. The predetermined number noted above is the number of trays that can be accommodated by the conveyer mechanism between the negative film intake station and print intake station. When the number of trays present between the negative film intake station and print intake station reaches the predetermined number, no further tray can be forwarded. Thus, the frame images on the printing paper planned for loading into the tray not forwarded are stopped being fed to the developing section. The predetermined number of trays acceptable to the conveyer mechanism is based on the collating capacity of the photographic processing apparatus. This is the number of trays loaded with negative films and prints and forwarded to the collating station by the conveyer mechanism before the frame images on the printing paper having entered the developing section are developed, cut and delivered to the print intake station. Even if the conveyer mechanism has a varied construction to accommodate more trays, the arrival of trays at the print intake station is delayed after all unless a change is made to the collating ability of the photographic processing apparatus. In any case, when the number of trays present between the negative film intake station and the print intake station exceeds the predetermined number, a delay in arrival of the trays must be expected.

In another preferred embodiment of this invention, the delay anticipating means anticipates the delay in arrival when one of trays stored at the collating station for collating the negative films and the prints carried by the trays, nearest to the negative film intake station is loaded.

The trays entering the collating station undergoes the collating operation successively, and the negative films and prints are collected from the trays for shipment. Thus, the trays in a forward region of the collating station usually are empty to be ready for movement to the negative film intake station. If the tray at the collating station nearest to the negative film intake station is not empty, there is no tray available for loading negative films at the negative film intake station. This would result in no timely arrival at the print intake station of a tray for loading the prints having the frame images of these negative films. Therefore, the printing paper printed with the frame images is stopped being fed to the developing station. If it is determined that no empty tray is available because of an interruption of the collating operation due to some trouble, the trays cannot be forwarded from the print intake station to the collating station since there is a limit to the number of trays storable at the collating station. Consequently, loading of prints into the trays is expected to come to a standstill, which requires the printing paper to be stopped being fed to the developing section.

In a preferred embodiment of this invention, feeding of the printing paper to the developing section is discontinued by cutting the printing paper prior to arrival at the developing section. In particular, the printing paper may be cut in a position thereof between adjacent units. Then, the operation for collating the negative films and prints may be resumed immediately after dealing with the delay in arrival of the tray.

Other features and the advantages of this invention will be apparent from the following description of the embodiments to be taken with reference to the drawings.

DESCRIPTION OF THE PREFERRED EMBODIMENTS

Figure 1:
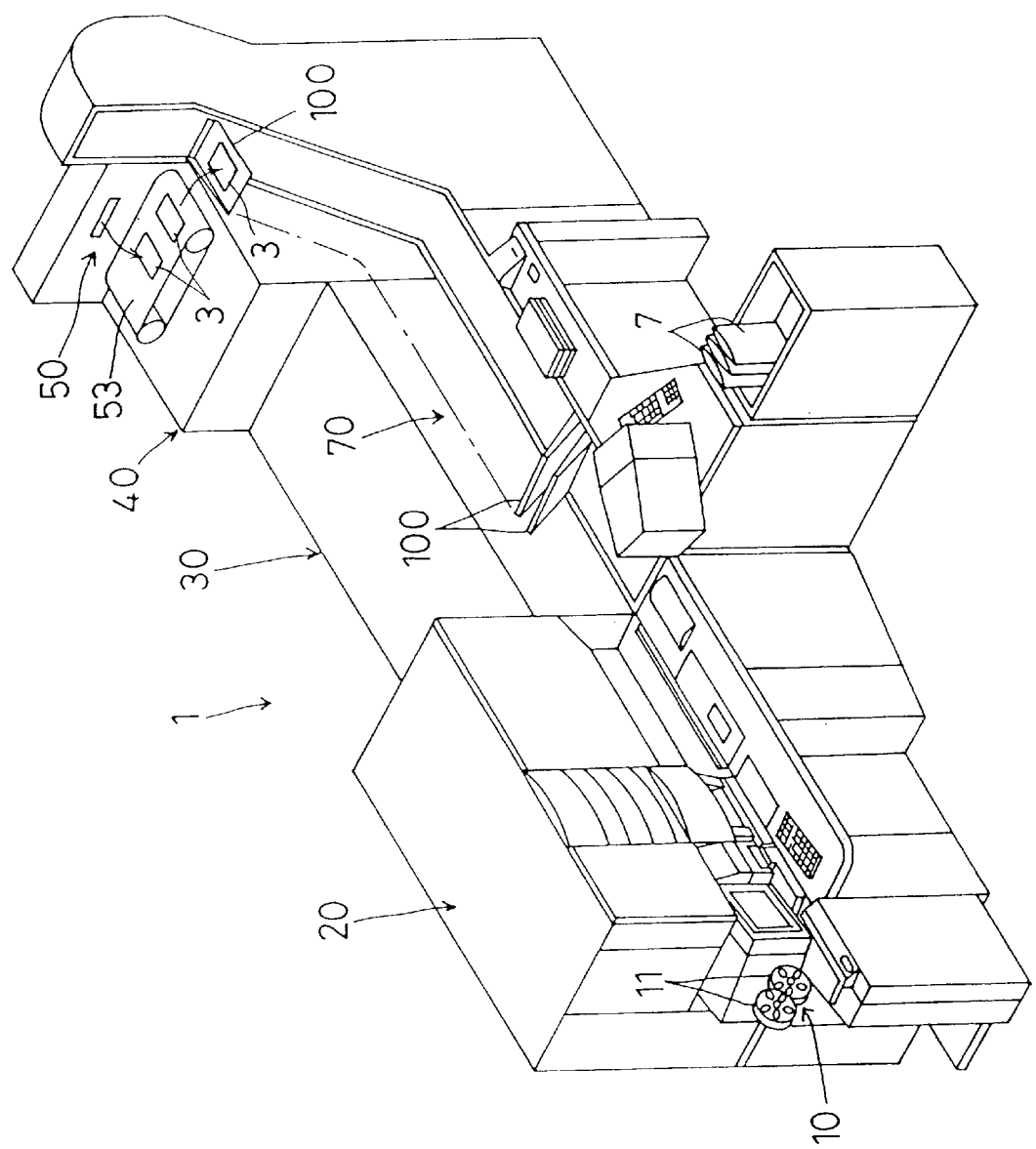
FIG. 1 is a perspective view of a photographic processing apparatus employing a photograph collating system according to this invention.
Figure 2:
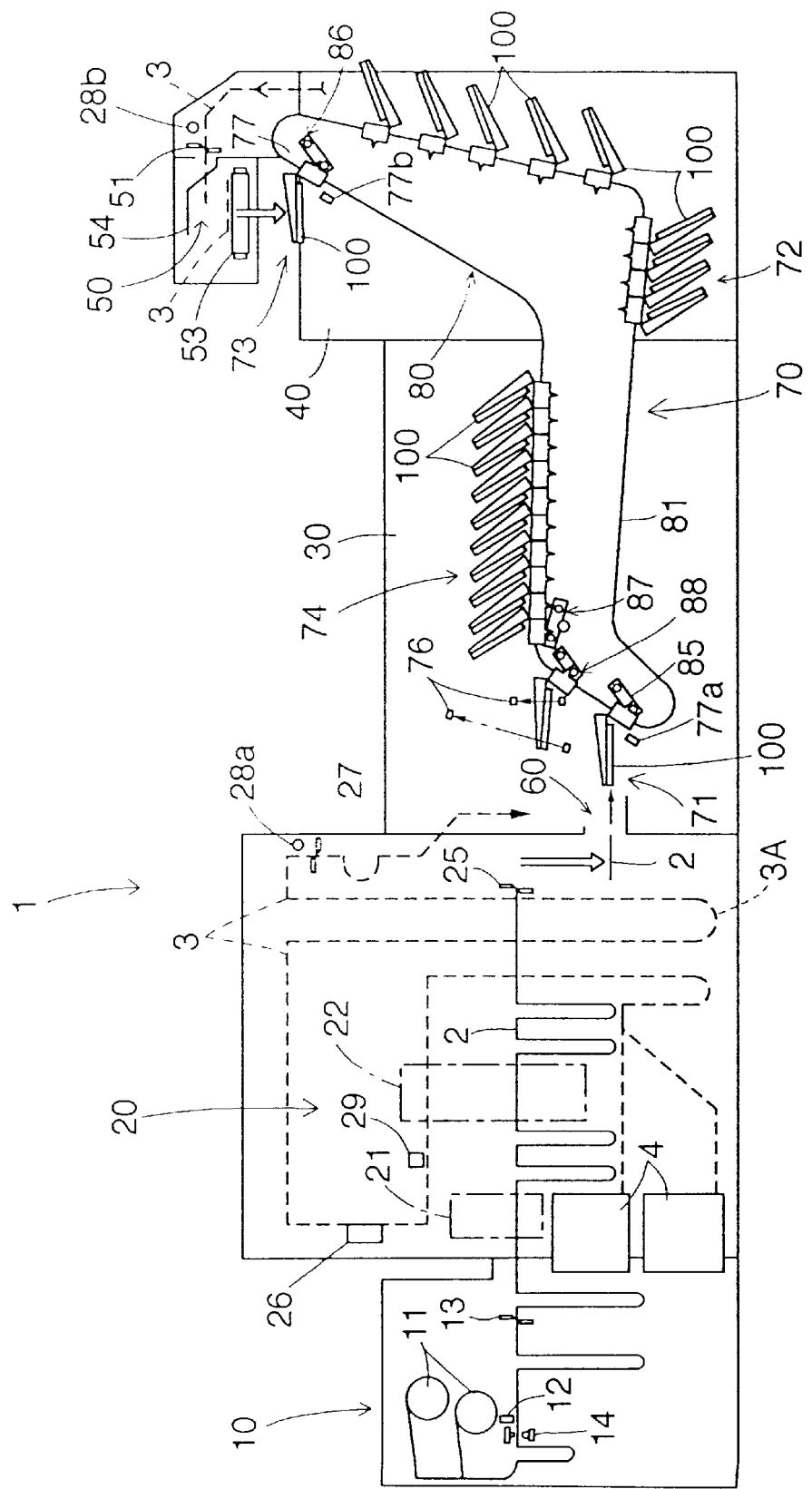
FIG. 2 is a schematic view of the photographic processing apparatus showing flows of negative films and printing paper in the apparatus of FIG. 1.

FIG. 1 shows an entire photographic processing apparatus 1 according to this invention. FIG. 2 schematically shows transport paths of a negative film 2 (the term negative film being used herein to refer collectively to a negative film having a length of one photographic film, cut piece negatives each having several frames, and a negative film in a cartridge designed for an advanced photo system) and printing paper 3 undergoing varied processes in the photographic processing apparatus 1. This photographic processing apparatus 1 includes a negative film feeder 10, an exposing section 20 for printing images of the negative film 2 on the printing paper 3 drawn from a paper magazine 4, a developing section 30 for developing the exposed printing paper 3, a drying section 40 for drying the developed printing paper 3, a print outlet 50 for cutting and discharging the dried printing paper 3 in predetermined lengths as prints, a negative film outlet 60 for cutting and discharging the negative film 2 used in the exposing section 20, with negative sheets inserted as necessary, and a conveyer mechanism 70 for collating and combining, as a finished product, the cut negative films 2 in one unit (which may be regarded as one order to facilitate understanding) received from the negative film outlet 60 and the prints in the one unit received from the print outlet 50, and transporting the finished product to a position for collection by the operator.

The negative film feeder 10 may be loaded with two negative reels 11 each having up to 100 negative films 2 connected by splicing tape. A bar-code reader 12 reads bar codes on the negative films 2 drawn from either negative reel 11. A negative cutter 13 cuts the negative films 2 order by order.

Figure 3:
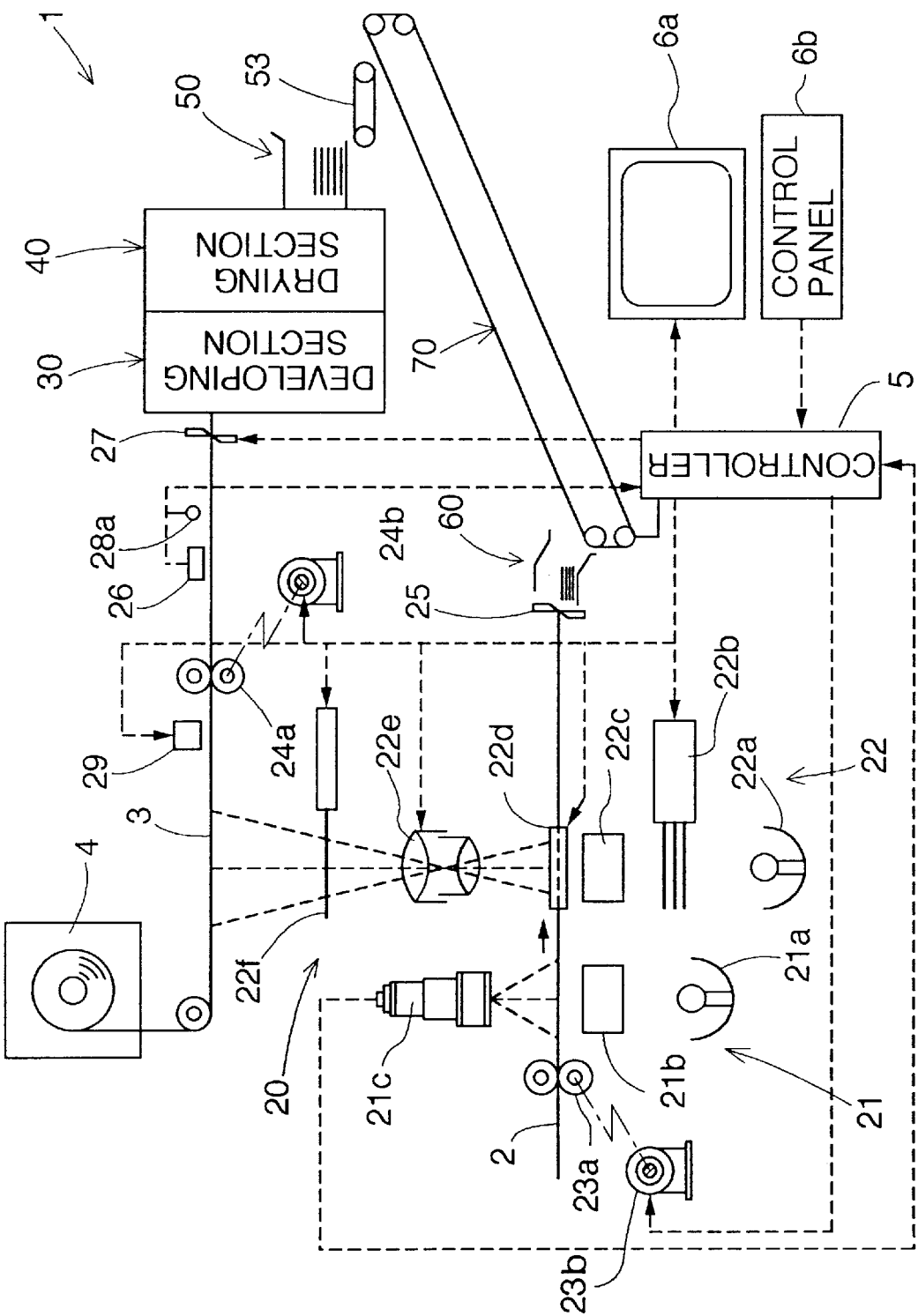
FIG. 3 is a block diagram of the photographic processing apparatus shown in FIG. 1.

As shown in FIG. 3 (in which the vertical arrangement of negative film 2 and printing paper 3 is inverted from FIG. 2), the exposing section 20 includes a film reader 21 disposed upstream with respect to a direction of film transport and having a reading light source 21a, a mirror tunnel 21b and an image pickup 21c, and an exposing device 22 disposed downstream with respect to the film transport direction and having an exposing light source 22a, a light adjustment filter 22b, a mirror tunnel 22c, a negative mask 22d, a printing lens 22e and a shutter 22f. Rollers 23a and a motor 23b for driving the rollers 23a are provided to transport the negative film 2 from the negative film feeder 10 through the exposing section 20 to the negative outlet 60.

Figure 4:
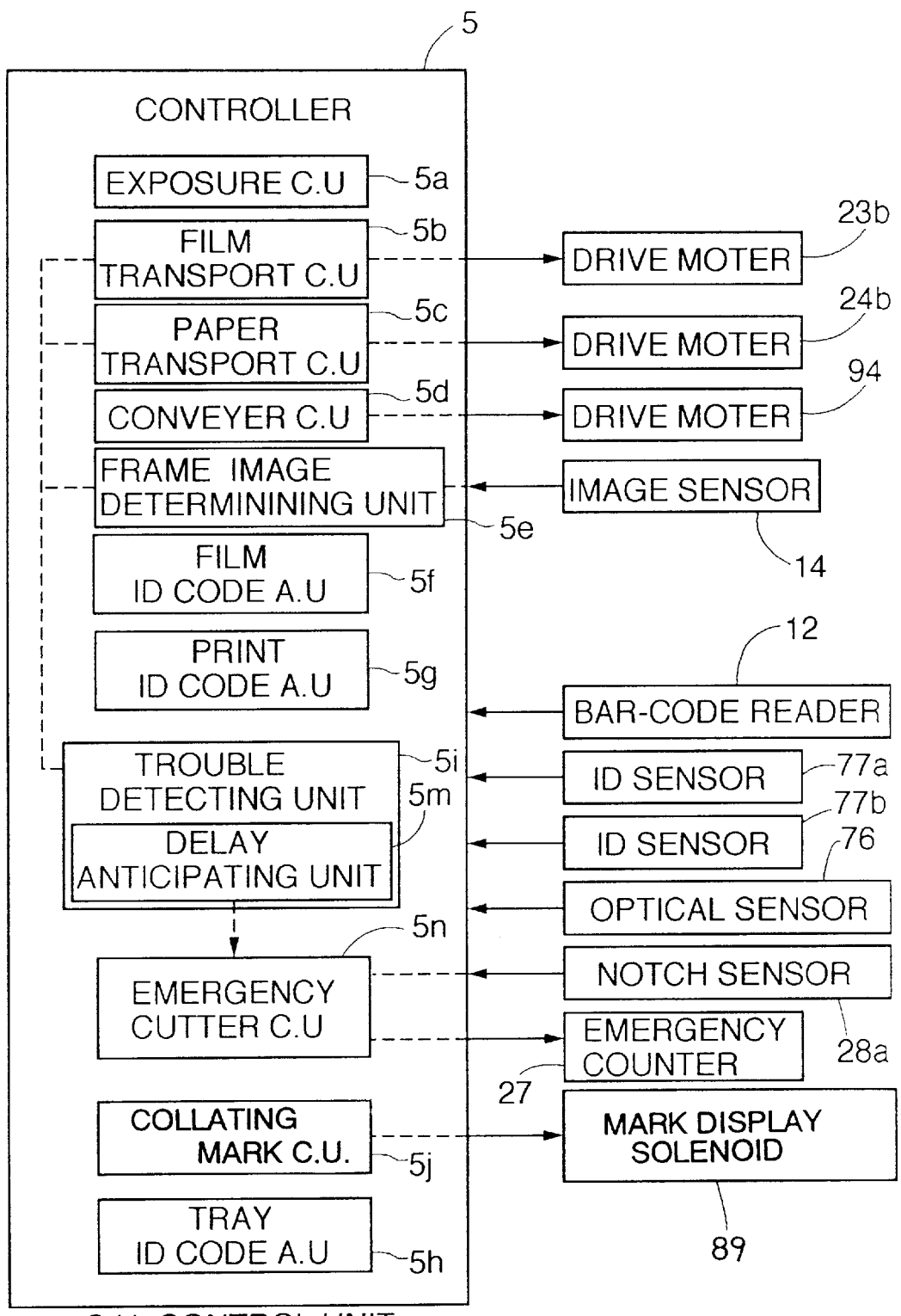
FIG. 4 is a block diagram of a controller.

First, the film reader 21 reads the image of each frame on the negative film 2 transported by the rollers 23a, and transmits image information to a controller 5 which is illustrated in detail in the block diagram of FIG. 4. From the image information received from the film reader 21, an exposure control unit 5a of the controller 5 derives exposing conditions for printing the images of the negative film 2 on the printing paper 3. The exposure control unit 5a controls the light adjustment filter 22b and shutter 22f based on the exposing conditions derived to expose the printing paper 3 when the corresponding frame on the negative film 2 arrives at the position of negative mask 22d. In addition, the controller 5 processes the image information of the negative film 2 read by the film reader 21, and causes a monitor 6a to display simulations of images to be printed on the printing paper 3 with the exposing conditions derived. The operator may observe the simulated images displayed on the monitor 6a, and correct the exposing conditions through a control panel 6b as necessary.

The negative film 2 emerging from the exposing section 20 is cut to a plurality of negative pieces 2 each having six or four frames by a negative cutter 25 in the negative outlet 60 disposed downstream of the exposing device 22 with respect to the film transport direction. The negative pieces 2 are delivered to the conveyer mechanism 70. Depending on specifications, the negative pieces 2 may be inserted into negative sheets by a negative inserter not shown, the negative sheets being folded before delivery to the conveyer mechanism 70. The negative film 2 designed for an advanced photo system is drawn out of the cartridge before the varied processes, and rewound into the cartridge again after the processes. This type of negative film 2 after the exposing process is delivered to the conveyer mechanism 70 as contained in the cartridge. The negative film 2 is drawn from the negative reel 11 and ultimately transported to the conveyer mechanism 70 under control of a negative film transport control unit 5b of the controller 5.

Figure 25:
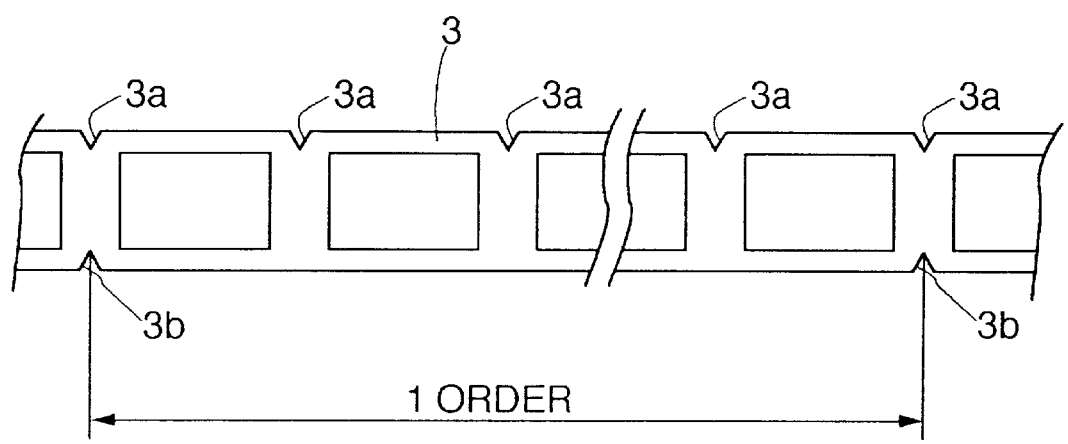
FIG. 25 is a schematic view showing division notches and cut notches formed in printing paper.

The developing section 30 includes a plurality of developing tanks not shown. The printing paper 3, with the images of the negative film 2 printed thereon in the exposing section 20, is passed though a notcher 29 (FIG. 2) for forming cut notches 3a and division notches 2b in edges of the printing paper 3 as shown in FIG. 25. The division notches 3b are used as divisions for frames in each unit (which usually corresponds to one order), while the cut notches 3a are used as divisions for each frame. Further, the printing paper 3 is transported by rollers 24a and a motor 24b for driving the rollers 24a, through a correction print unit 26, and successively through the developing tanks in the developing section 30 to be developed. An emergency cutter 27 is disposed upstream of the developing section 30 for cutting the printing paper 3 in an emergency, e.g. when the printing paper 3 cannot be fed from the exposing section 20 to the developing section 30 despite the presence of a loop. A notch sensor 28a also is disposed upstream of the developing section 30 for detecting the division notches 2b formed in the edge of printing paper 3 to be used as divisions for frames in each unit. The emergency cuter 27 cut the printing paper 3 unit by unit.

The developed printing paper 3 is dried in the drying section 40 and forwarded to the print outlet 50, where the paper 3 is cut by a paper cutter 51 to become finished prints 3. The prints 3 are delivered by a transverse conveyer 53 to the conveyer mechanism 70. Numeral 54 denotes a printing paper bypass for discharging a region of the printing paper 3 as waste paper to a different location when that region of printing paper 3 has no image owing to some trouble. The waste region is indicated by the division notches 3b formed in the edge of printing paper 3. A notch sensor 28b is disposed upstream of the paper cutter 51 with respect to the paper transport direction for detecting the division notches 3b as well as the cut notches 3a for cutting prints. The series of operations for transporting the printing paper 3 or prints 3 and shunting the paper to the bypass 54 is controlled by a paper transport control unit 5c of the controller 5.

Figure 5:
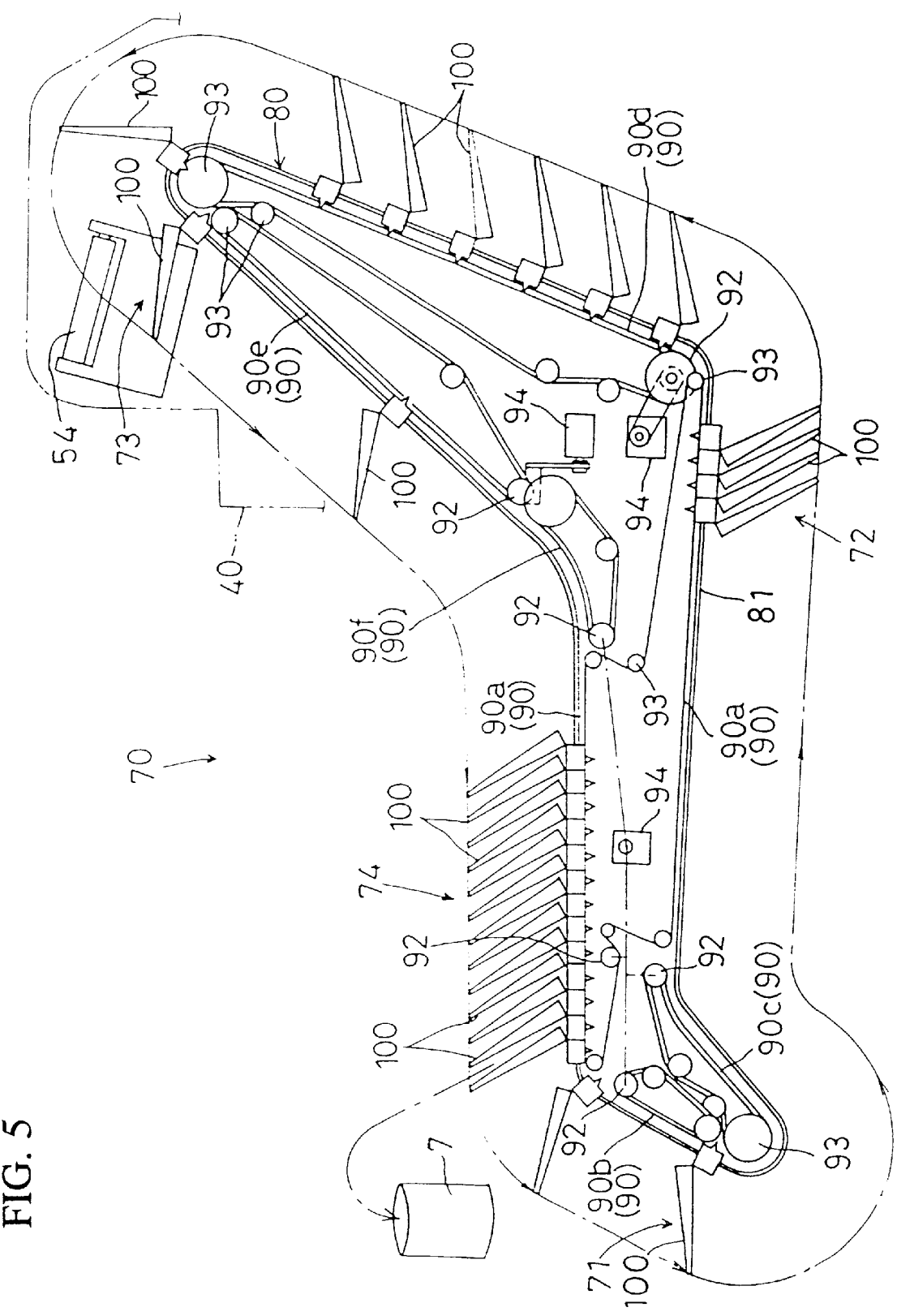
FIG. 5 is a schematic view of a conveyer mechanism forming part of the photograph collating system.
Figure 6:
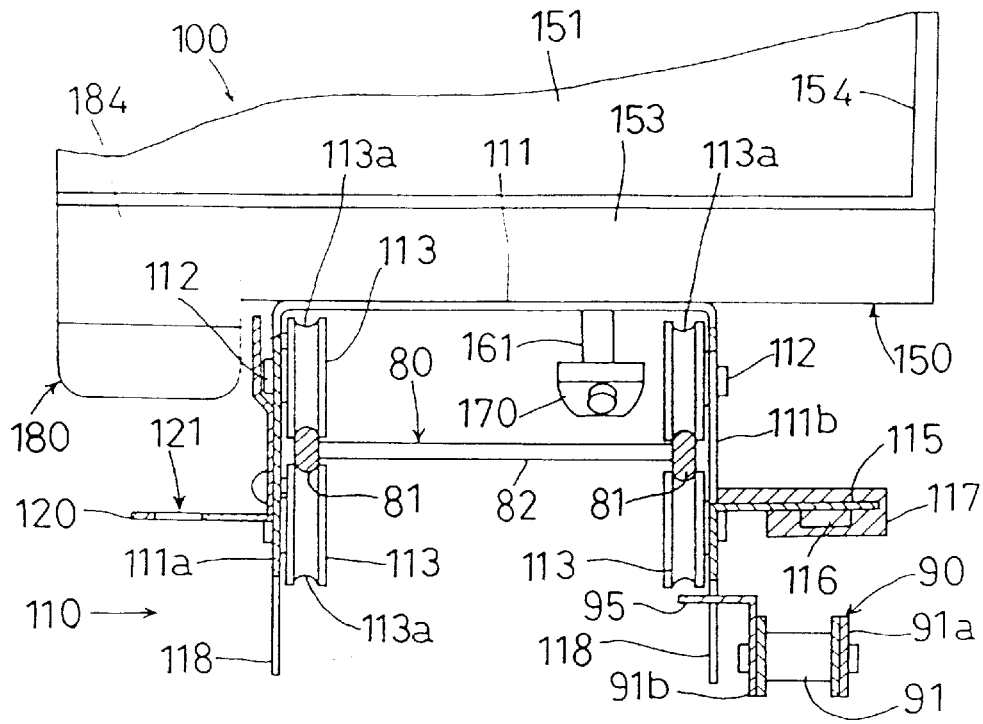
FIG. 6 is an explanatory view showing a relationship between a drive unit and a running device of a tray.

As shown in FIG. 5, the conveyer mechanism 70 is the tray conveyer type including a plurality of trays 100 driven by a drive device 90 to move along a guide circuit 80. A transport line provided by the guide circuit 80 includes a negative film intake station 71, a standby station 72, a print intake station 73 and a collating station 74. As shown in FIG. 6, the guide circuit 80 is formed of a pair of right and left rails 81 having an approximately circular section and a connector 82 interconnecting the rails 81 with a predetermined spacing therebetween. The guide circuit 80 extends along side walls of the developing section 30 and drying section 40 and between the negative film outlet 60 disposed in a lower position of the photographic processing apparatus 1 and the print outlet 50 disposed in an upper position thereof.

Figure 7:
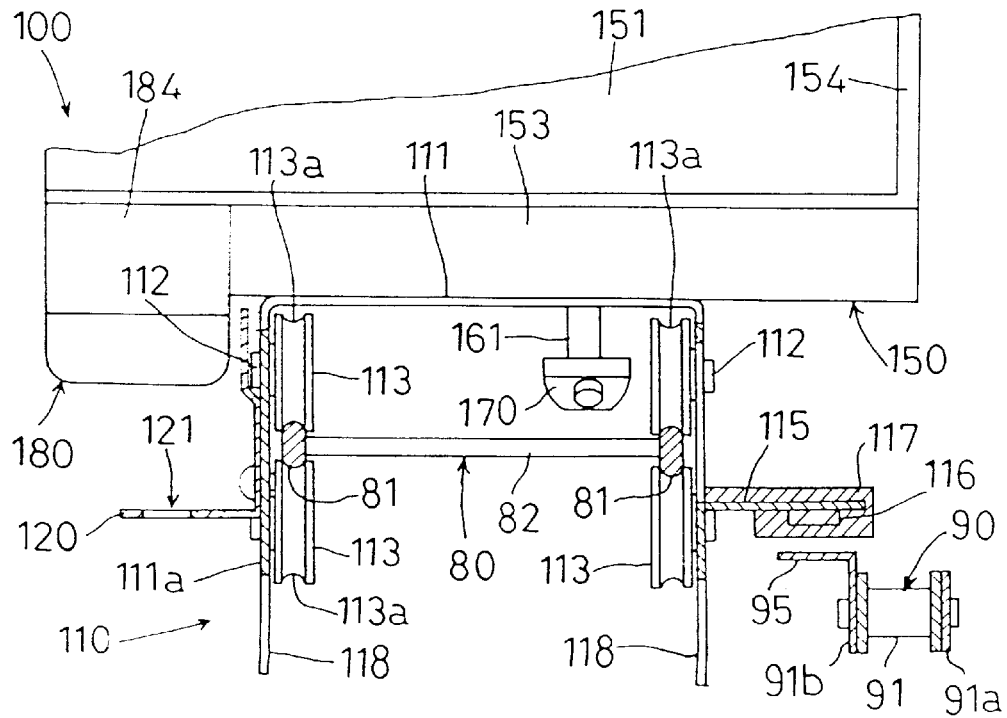
FIG. 7 is an explanatory view showing a relationship between another drive unit and the running device of the tray.
Figure 8:
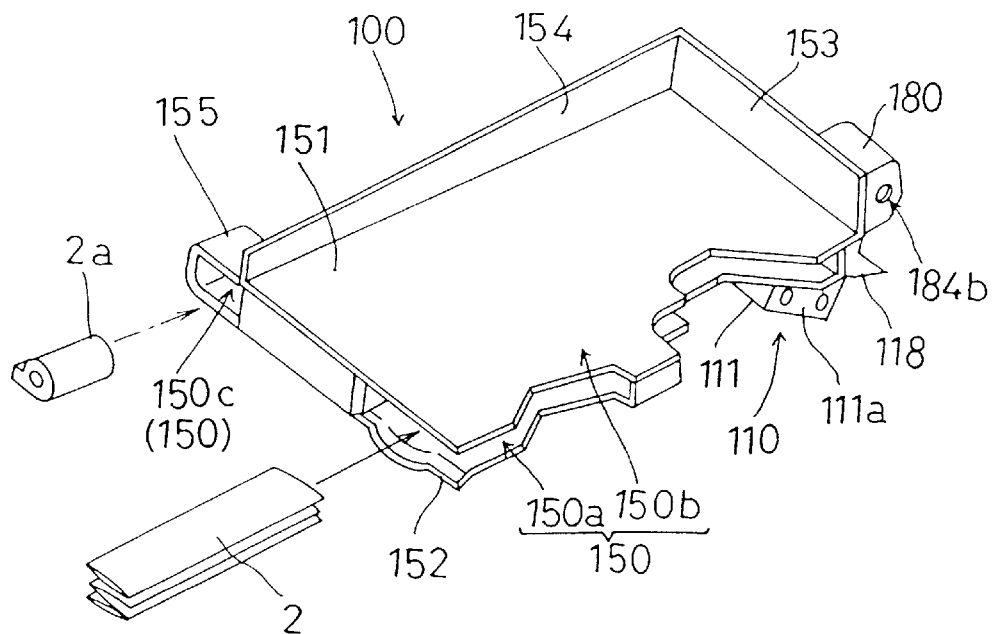
FIG. 8 is an explanatory view showing loading of negative films into a film holder.

As shown in FIGS. 6 through 8, each tray 100 includes a running device 110 for running on the rails 81, and a carrier 150 having a film holder 150a and a print holder 150b. The running device 110 has a channel-shaped running base 111, four running rollers 113 rotatably supported through axles 112 inside each of opposite side ribs 111a and 111b of the running base 11, and an angle bracket 114 (FIG. 9) for attaching the carrier 150 to the running base 111 at an angle thereto. The eight running rollers 113 of each tray 100 have running surfaces defining grooves 113a shaped to fit on the rails 81. The running device 110 runs steadily on the rails 81, with upper and lower front running rollers 113 and upper and lower rear running rollers 113 on the right rib 111a gripping the right rail 81 in two positions thereof, and upper and lower front running rollers 113 and upper and lower rear running rollers 113 on the left rib 111a gripping the left rail 81 in two positions thereof.

At the negative film intake section 71, negative films 2 in one unit discharged from the negative film outlet 60 are transferred to the film holders 150a of trays 100. At the standby station 72, the trays 100 loaded with the negative films 2 can stand by to ensure timing to discharge from the print outlet 50 of prints 3 in the one unit having the images of negative films 2 loaded into the trays 100. At the print intake station 73, the prints 3 in the one unit on which the images of negative films 2 stored in the film holders 150a are printed are transferred from the print outlet 50 to the print holders 150b of trays 100. At the collating station 74, the negative films 2 and prints 3 in the one unit carried by the trays 100 are collated, collected from the trays and put into a product packet. Such collation and collection from each tray 100 are not synchronized with delivery of the trays 100 to the collating station 74. Thus, at the collating station 74, as at the standby station 72, the trays 100 may be stored on the rails 81. Emptied trays 100 are forward to the negative film intake station 71 again.

The trays 100 are transported by a drive device 90 of the chain drive type employing chains 91 as endless drive elements. As seen from FIG. 5, the drive device 90 is divided into a first to a sixth drive units 90a–90f. The first drive unit 90a extends between the collating station 74 and standby station 72. The second drive unit 90b is arranged to move emptied trays 100 to a tray stopping position in the negative intake station 72. The third drive unit 90c is arranged to move the trays 100 loaded with the negative films 2 to a storage line at the standby station 72 defined partly by the first drive unit 90a. The fourth drive unit 90d is arranged to move the trays 100 stored in the standby station 72 successively to a tray stopping position in the print intake station 73. As seen from FIG. 5, the fourth drive unit 90d moves the trays 100 up a steep slope. The fifth drive unit 90e moves the trays 100 additionally loaded with prints 3 down a steep slope to a portion of the first drive unit 90a forming the collating station 74. Since the guide circuit 80 is curved upstream of the collating station 74, the sixth drive unit 90f is disposed between the fifth drive unit 90e and the first drive unit 90a to move the trays 100 along the curved line. Each of the above drive units includes a chain 91, a drive sprocket 92 and direction changing sprockets 93 engaging the chain 91, and a drive motor 94 for driving the drive sprocket 92. The first, second, third and sixth drive units 90a, 90b, 90c and 90f receive power from a common drive motor 94. The fourth and fifth drive units 90d and 90e must operate intermittently in a timed way, and therefore receive power from individual drive motors 94, respectively. Each chain 91 includes not only ordinary link plate 91a but pulling link plates 91b defining hitches 95 arranged at predetermined intervals and extending axially of the rollers. Each chain 91 moves the trays 100 by means of these hitches 95.

Two types of engagement are employed for drive transmission between the hitches 95 and the running devices 110 of the trays 100. That is, to form the storage lines, the first drive unit 90a produces an engagement as shown in FIG. 7. A magnet 116 is fixed by a resin 117 to a lower surface of a mounting plate 115 extending perpendicular to and outwardly of the rib 111b of each running device 110. A magnetism acts between the magnet 116 and each hitch 95 of the chain 91 to form an engagement between the running device 110 of each tray 100 and each hitch 95 of the chain 91, whereby the chain 91 moves the tray 100. For this purpose, at least the pulling link plates 91b are formed of a magnetic substance. Thus, when the tray 100 is stopped running by a force greater than the magnetism acting between the tray 100 and chain 91, the engagement between the magnet 116 and hitch 95 is broken whereby only the chain 91 moves forward, leaving the tray 100 standing still. In this way, the trays 100 are successively stored with end surfaces of the running bases 111 contacting each other. After a preceding tray moves forward, the magnet 116 of a next tray 100 magnetically engages a hitch 95 of chain 91 again. Thus, the next tray 100 begins to be moved by the chain 91. That is, the trays 100 are stored and advanced to the position for taking out the negative films 2 and prints 3 automatically and without delay.

The drive units other than the first drive unit 90a have only to move trays 100 and chains 91 together. As shown in FIG. 6, lugs 118 extend downward from lower ends of the ribs 111a and 111b of each running base 110 to contact the hitches 95 of chain 91. As a result, an engagement is produced to transmit drive between the running device 110 and hitches 95. The drive motors 94 are controlled by a conveyer control unit 5d of the controller 5 in a coordinated way.

At the negative film intake station 71, the trays 100 are stopped by a first stopper 85 between the second drive unit 90b the third drive unit 90c to receive negative films 2 from the negative outlet 60. Further, at the print intake station 73, the trays 100 are stopped by a second stopper 86 between the fourth drive unit 90d and fifth drive unit 90e to receive prints 3 from the print outlet 50. The first stopper 85 and second stopper 86 have the same construction. The construction of the first stopper shown in FIG. 9 will be described here.

Figure 9:
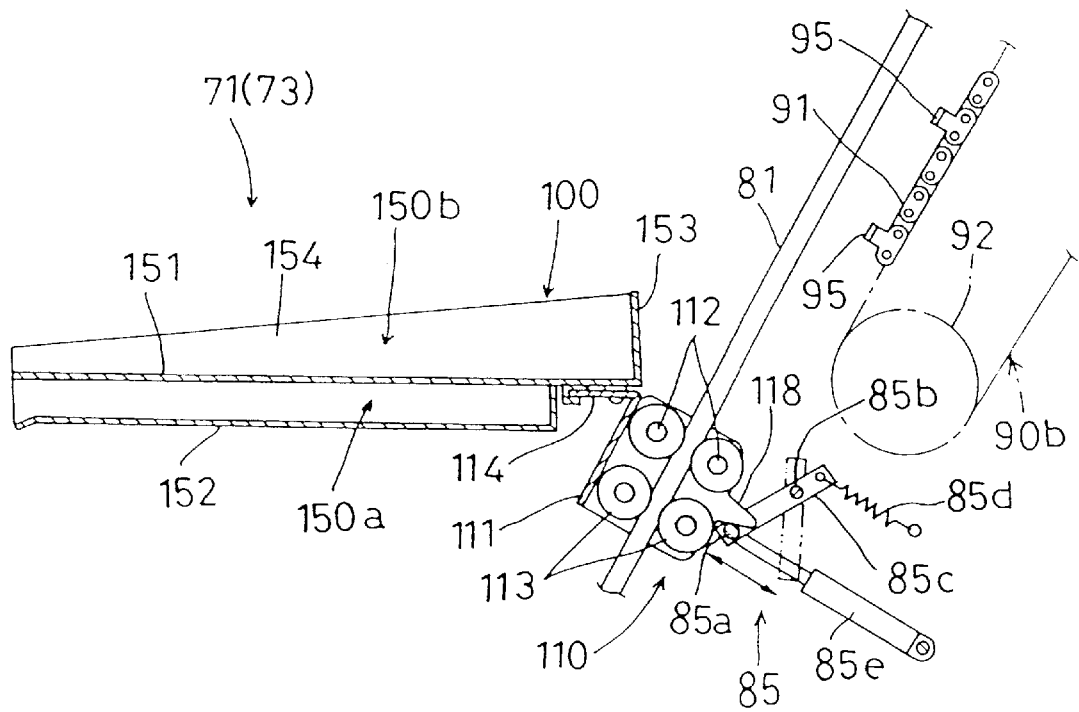
FIG. 9 is a schematic view of a first stopper.

The first stopper 85 includes a swing arm 85c pivotable about an axis 85b, an engaging pin 85a disposed at one end of the swing arm 85c for engaging, upon swing of the swing arm 85c, one of the lugs 118 on the running base 111 of each tray 100, a spring 85d engaged with the other end of the swing arm 85c to bias the swing arm 85c clockwise about the axis 85b in FIG. 9, and a linear acting solenoid 85e connected to the swing arm 85c adjacent the engaging pin 85a. When energized, the linear solenoid 85e swings the swing arm 85c counterclockwise about the axis 85b in FIG. 9. When the linear solenoid 85e is de-energized, the engaging pin 85a enters a moving track of the lugs 118 of trays 100. Thus, the first stopper 85 stops the tray 100 released from the hitch 95 of the second drive unit 90b and sliding down the sloping rails 81. When the linear solenoid 85e is energized, the engaging pin 85a is retracted from the moving track of the lugs 118 of trays 100 to permit passage of the trays 100. The positional relationship between the second stopper 86 and the fourth drive unit 90d, and downward sloping of the rails 81, are similar to the case of the first stopper 85. The second stopper 86 can similarly control stopping and passage of the trays 100.

Figure 10:
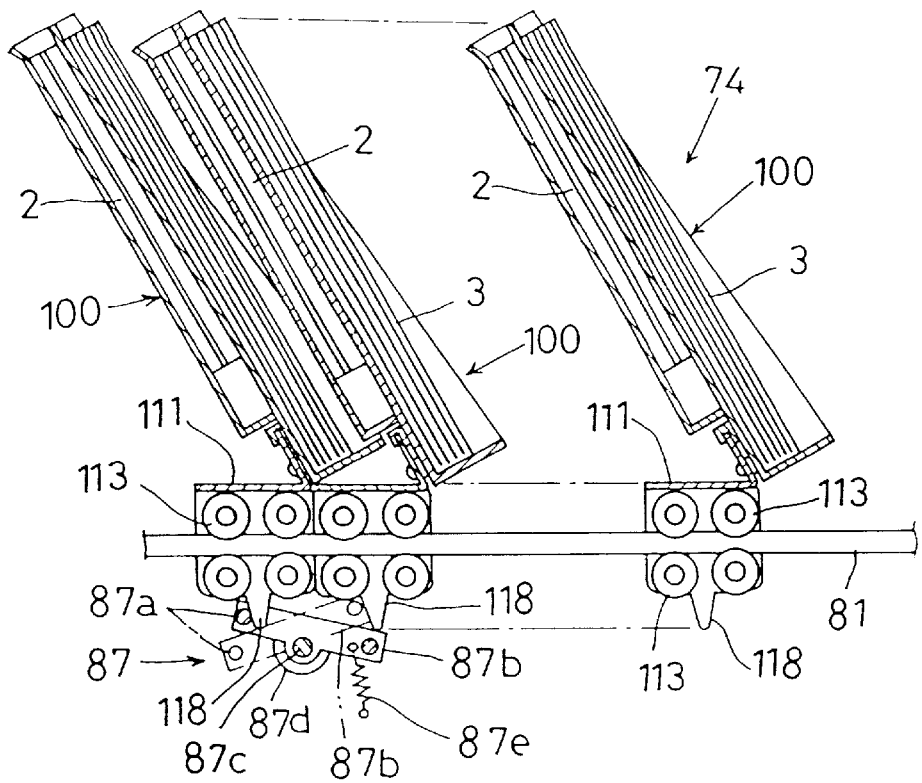
FIG. 10 is a schematic view of a third stopper.

The collating station 74 has a third stopper 87 for stopping a leading end of trays 100 stored. As shown in FIG. 10, the third stopper 87 includes a swing arm 87b which makes seesaw movement about a rotary shaft 87c, a pair of engaging pins 87a disposed at opposite ends of the swing arm 87b for selectively engaging the lugs 118 of trays 100 upon swing of the swing arm 87b, a rotary solenoid 87d connected to the rotary shaft 87c to swing the swing arm 87b, and a spring 87e engaged with one end of the swing arm 87b to bias the swing arm 87b clockwise in FIG. 10. With the third stopper 87 having the above construction, when the rotary solenoid 87d is de-energized, the spring 87e places the swing arm 87b in a position shown in solid lines in FIG. 10, to stop the leading tray 100. The other trays 100 following the leading tray 100 are moved along the rails 81 by magnetism until each contacts a preceding tray 100. Upon contact with the preceding tray 100, the movement by magnetism becomes impossible, and thus the trays 100 are successively stored close to one another. When the rotary solenoid 87d is energized, the swing arm 87b is moved against the biasing force of spring 87e to a position shown in two-dot-and-dash lines in FIG. 10, to stop the next tray 100. The first drive unit 90a, by magnetism, starts moving the leading tray 100 now freed. When, in this state, the rotary solenoid 87d is de-energized, the swing arm 87b returns to the position shown in the solid lines in FIG. 10, to stop the new leading tray 100 having been moved slightly by the first drive unit 90a. The tray 100 released from the first drive unit 90a moves toward the second drive unit 90b with the aid of the downward slope, and is stopped by a fourth stopper 88 disposed between the first drive unit 90a and second drive unit 90b.

Figure 11:
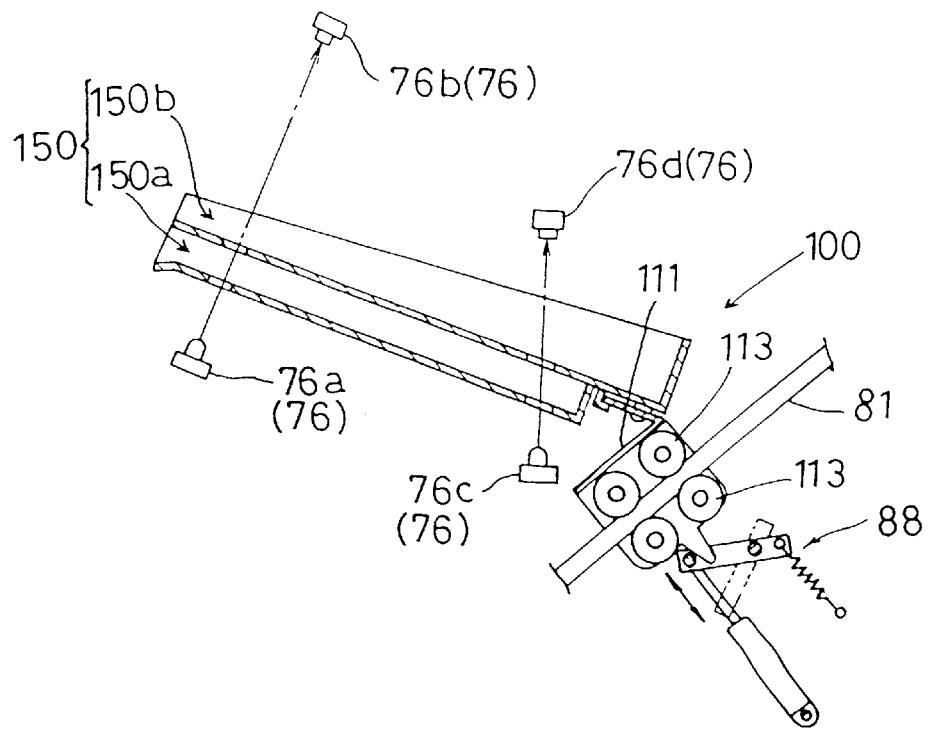
FIG. 11 is a schematic view of an optical sensor.

The fourth stopper 88 is operable to time forwarding of each tray 100 to the negative film intake station 71. The fourth stopper 88 is controlled to advance a new tray 100 simultaneously with departure of a preceding tray 100 from the negative film intake station 71. That is, the third stopper 87 and fourth stopper 88 advance one stored tray 100 after another to the negative film intake station 71, while at the same time the trays 100 are successively advanced along the storage line of the collating station 74. As shown in FIG. 11, the fourth stopper 88 has substantially the same construction as the first stopper 85 and second stopper 86, and will not be described further.

As shown in FIG. 11, an optical sensor 76 is provided in a position where each tray 100 is stopped by the fourth stopper 88, for detecting negative films 2 and prints 3 stored in the film holder 150a and print holder 150b of tray 100, respectively. The optical sensor 76 includes an LED 76a and a light receiving element 76b for detecting negative films 2, and an LED 76c and a light receiving element 76d for detecting prints 3. The carrier 150 defines bores (not shown) for allowing passage of light emitted from the LED 76a and LED 76c. Detection signals of the optical sensor 76 are inputted to the controller 5 which determines whether the tray 100 stopped by the fourth stopper 88 is empty or not. The operations of the first stopper 85, second stopper 86, third stopper 87 and fourth stopper 88 are controlled by the controller 5.

Figure 12:
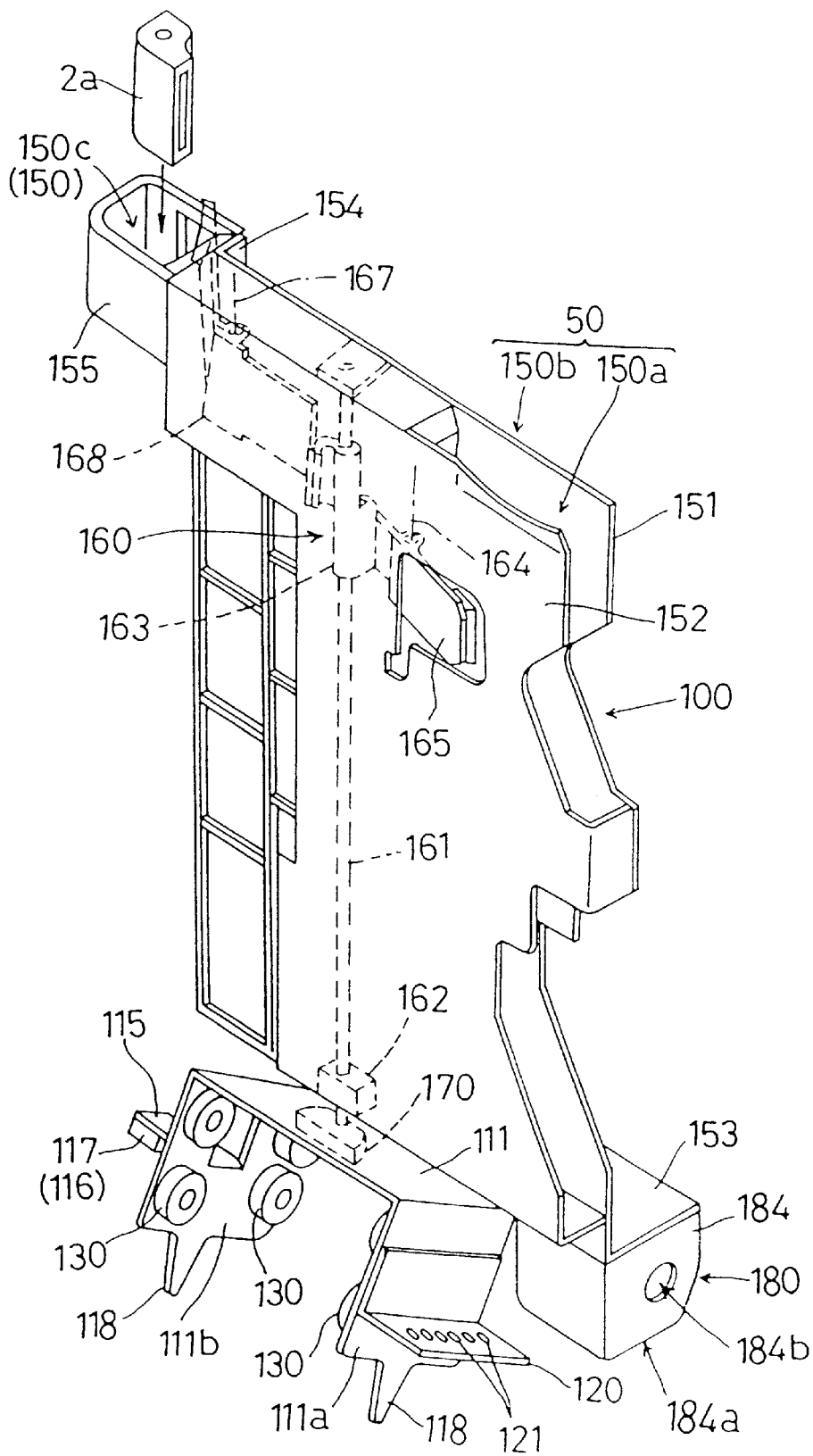
FIG. 12 is a perspective view of a tray.
Figure 13:
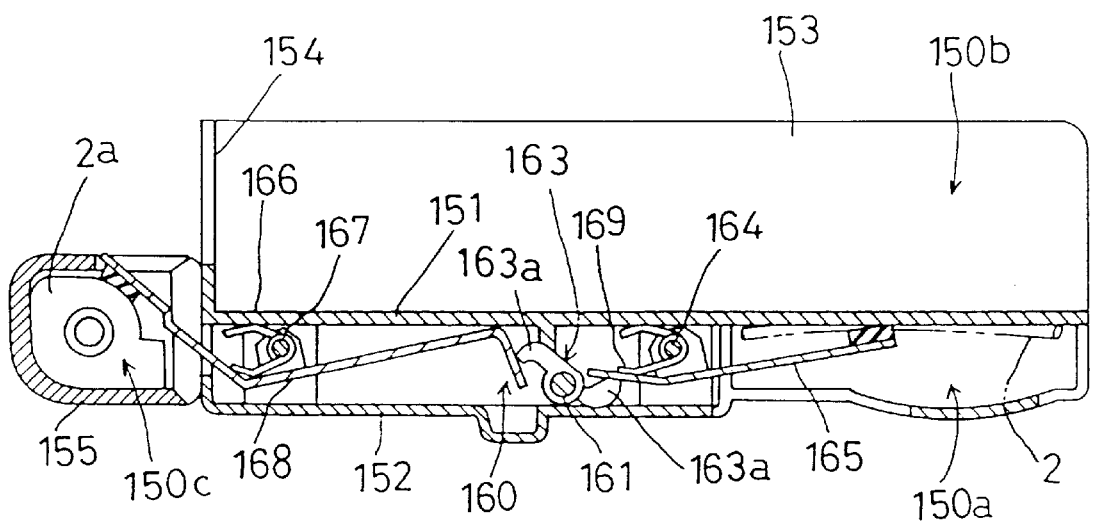
FIG. 13 is a sectional view of a pressing/retaining mechanism of a tray.
Figure 14:
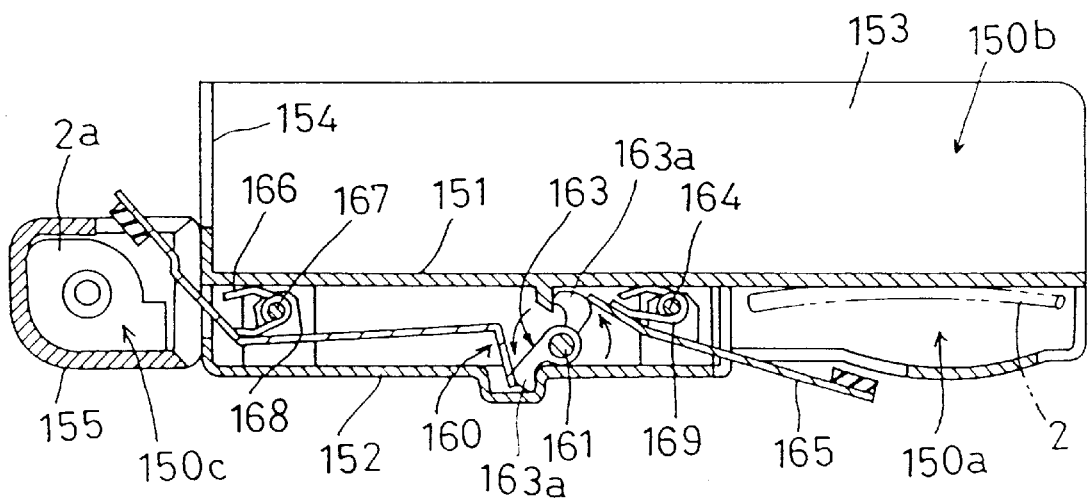
FIG. 14 is a sectional view of the pressing/retaining mechanism of the tray.

The construction of the carrier 150 of tray 100 will be described with reference to FIG. 12. The carrier 150 is in the form of a box having, as main components thereof, a top plate 151, a bottom plate 152, a first side plate 153 and a second side plate 154. The print holder 150b is formed on the top plate 151. To retain the prints 3 as stacked on the top plate 151, the first side plate 153 and second side plate 154 project from the top plate 151 to enclose the prints 3 from two directions. The print holder 150b is open in the remaining two directions to facilitate loading and unloading of the prints 3. The film holder 150a is in the form of a pocket between the top plate 151 and bottom plate 152 for storing negative films 2, i.e. bare piece negatives or piece negatives inserted into negative sheets. In addition, a cartridge holder 150c is provided in the form of a box 155 attached to an outer surface of the second side plate 154 and opposed to the film holder 150a, for storing a cartridge 2a containing a roll of negative film 2 designed for an advanced photo system.

Figure 15:
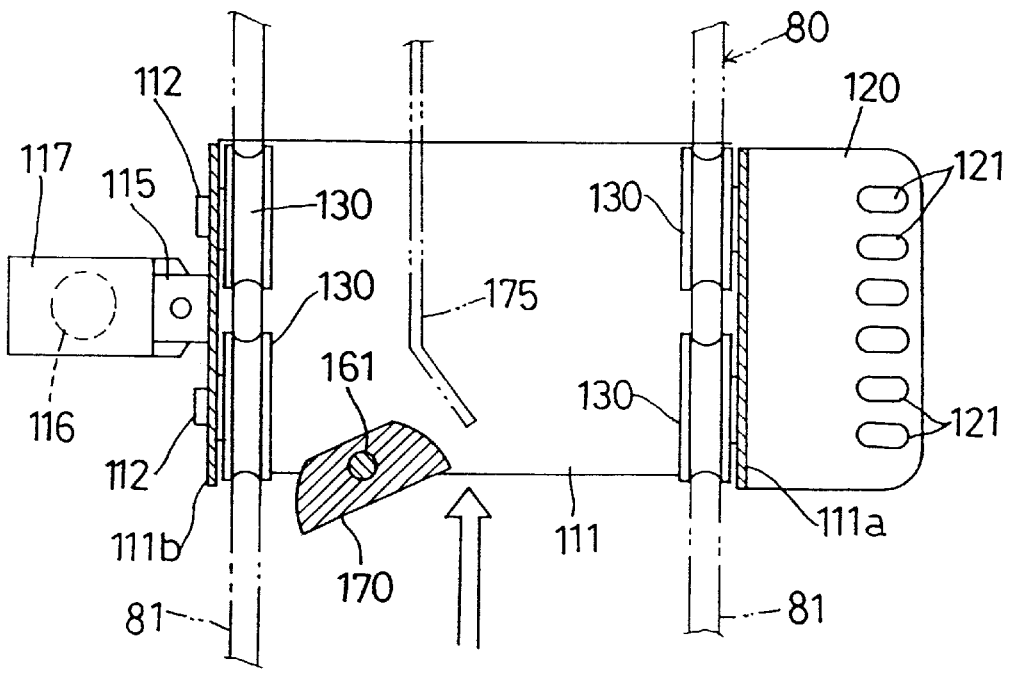
FIGS. 15A, 15B is an explanatory view showing operation of a control knob.
Figure 15:
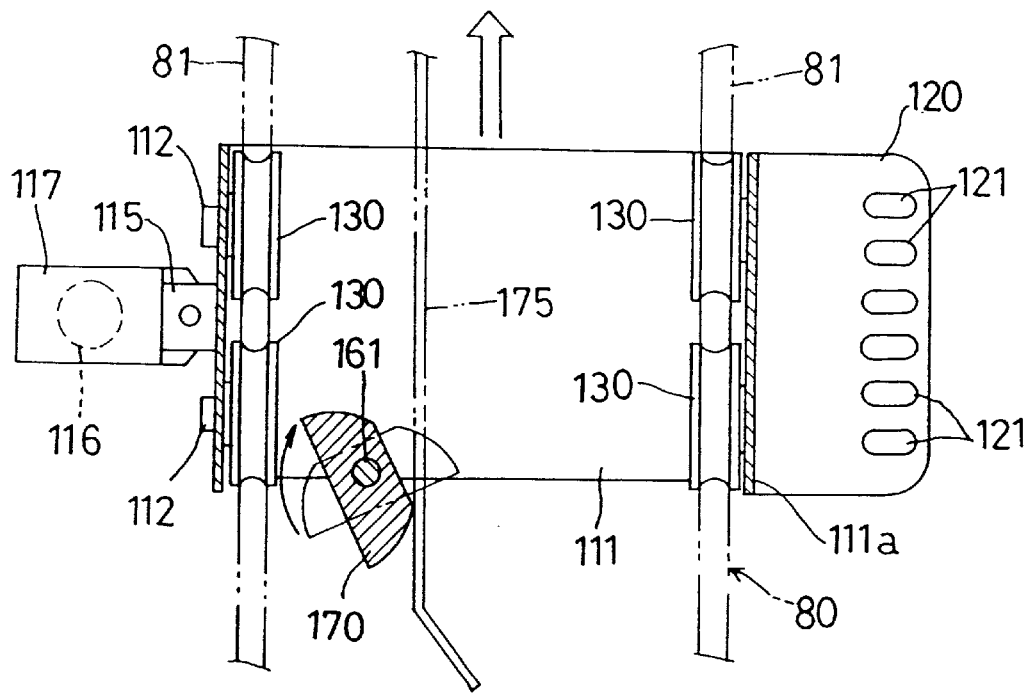

As seen from FIG. 5, the trays 100 are suspended upside down during their movement from the negative film intake station 71 to the standby station 72. To prevent the articles falling from the film holder 150a and cartridge holder 150c, the tray 100 includes a pressing/retaining mechanism 160. As illustrated in FIGS. 12 through 15, the pressing/retaining mechanism 160 includes a shaft 161 rotatably supported by the bottom plate 152 through a plurality of bearing brackets 162, a lug sleeve 163 fixed to the rotatable shaft 161, a first presser plate 165 pivotable in seesaw motion about a shaft 164 fixed to the top plate 151 to press one end thereof upon the negative films stored in the film holder 150a, and a second presser plate 168 pivotable in seesaw motion about a shaft 167 fixed to the top plate 151 to press one end thereof upon the cartridge stored in the cartridge holder 150c. The first presser plate 165 and second presser plate 168 are pivotable in opening directions by a turning force of the lug sleeve 163 transmitted through contact with lugs 163a on the lug sleeve 163. The presser plates 165 and 168 are pivotable in pressing directions under spring load, and for this purpose helical springs 166 and 169 are provided therefor, respectively. For turning the rotatable shaft 161, a rounded control knob 170 is fixed to the end of the shaft 161 opposed to the running base 111. As shown in FIG. 15, the control knob 170 is operable through contact with a knob guide rail 175, to turn the rotatable shaft 161. As a result, the lug sleeve 163 is displaced from the position shown in FIG. 13 to the position shown in FIG. 14. The lugs 163a thereby push up the first and second presser plates 165 and 168 against the forces of the helical springs 166 and 169, to open the first and second presser plates 165 to allow negative films 2 to be loaded into the film holder 150a and the cartridge 2a into the cartridge holder 150c. Upon termination of the contact between the knob guide rail 175 and control knob 170, the first and second presser plates 165 and 168 assume positions to press the articles stored. Therefore, the knob guide rail 175 is disposed in a region of the tray 100 where the negative films 2 are moved in and out.

As seen from FIG. 4, the controller 5 performs various functions besides the functions described hereinbefore. Based on results of detection by an image sensor 14 with respect to the negative films 2 drawn from the negative reel 11, a frame image determining unit 5e determines whether the negative films 2 have a trouble such as back exposure, total fogging, total blanking or half size. A negative film ID code allocating unit 5f allocates a negative film ID code corresponding to a film ID (hereafter referred to as FID) read by the bar-code reader 12 from a bar code seal applied to the negative films 2 in one unit. This negative film ID code is used, in place of the FID, in the processes in the photographic processing apparatus 1 to identify the negative films 2 in one unit. An ID code for a product packet 7 is linked to each FID. By collating these ID codes, the negative films 2 with a particular FID are put in into a predetermined product packet 7. To assure that the prints 3 produced from these negative films 2 be put into the predetermined product packet 7, a print ID code allocating unit 5g is provided to allocate a print ID code to the area of printing paper 3 printed with frame images of the negative films 2 in the exposing section 20. This print ID code also is linked to the negative film ID code. A trouble detecting unit 5i detects a trouble determined by the frame image determining unit 5e, and a collation error or disagreement due to transport jamming detected by the negative film transport control unit 5b which entails a forced discharge of the negative films 2. Such trouble is linked as trouble information to the negative film ID code and print ID code of the negative films 2 responsible for the collation error or disagreement.

Figure 16:
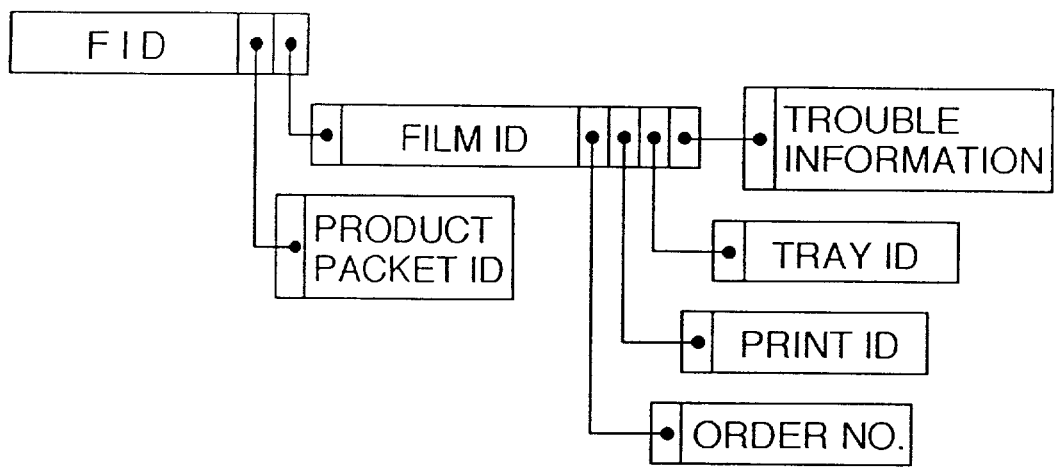
FIG. 16 is a schematic view illustrating a structure for linking varied ID codes.

To facilitate understanding of a link structure of the above various ID codes and trouble information, the link structure is schematically shown in FIG. 16. The negative film ID code has also an orders number linked thereto. The negative films 2 and prints 3 with a linked negative film ID code and print ID code are loaded into one tray 100 to be combined and collated automatically. For this purpose, a tray ID code allocating unit 5h links the tray ID code to the negative film ID code, and hence to the print ID code. The tray ID code is generated as a 6-bit code by two ID sensors 77a and 77b arranged in predetermined positions of the guide circuit 80 for reading perforations 121 in an ID plate 120 attached to the running base 111 of each tray 100 and indicating the tray ID code. The tray ID code is transmitted to the tray ID code allocating unit 5h of the controller 5. The ID sensor 77a is disposed at the negative film intake station 71, while the ID sensor 77b is disposed at the print intake station 73.

Figure 17:
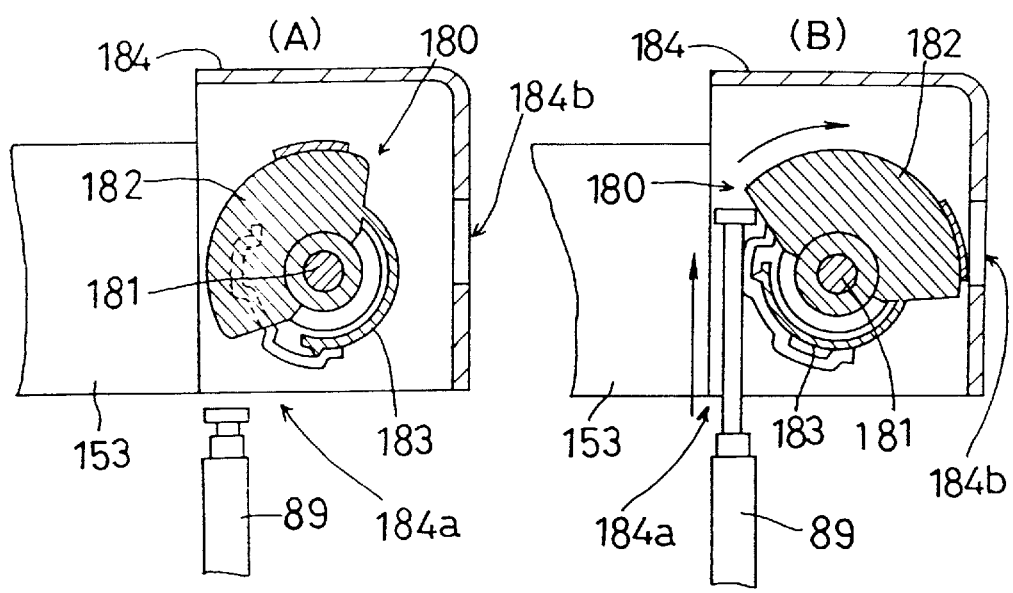
FIG. 17 is a schematic view of a collating mark display.

The tray 100 has a collating mark display 180 attached to the first side plate 153 next to a bracket 114. This collating mark display 180 is used as an alarm device for notifying a disagreement between the negative films 2 and prints 3 to be loaded into the tray 100. As shown in FIG. 17, the collating mark display 180 includes a drum 182 rotatable about an axis 181, an elastic element 183 elastically supporting the drum 182, and a housing 184 accommodating the drum 182. The housing 184 defines an opening 184a for receiving an external force to move the drum 182, and a display bore 184b. The drum 182 has a part of a peripheral wall thereof painted red. When the drum 182 rotates to a first position, the red is seen through the display bore 184b. When the drum 182 rotates to a second position, a ground color, e.g. white, is seen through the display bore 184b. The negative films 2 and prints 3 in one unit to be placed on the same tray 100 may not be in agreement owing to some trouble occurring during the processing of the negative films 2 and printing paper 3 in the photographic processing apparatus 1. Then, trouble information is linked to the ID codes of these negative films 2 and prints 3. When the tray 100 stands still at the print intake station 73, a collating mark control unit 5j of the controller 5 causes a mark displaying solenoid 89 disposed at the print intake station 73 to rotate the drum 182 from the second position to the first position. This action notifies the operator that the negative films 2 and prints 3 on this tray are in disagreement. The drum 182 in the first position is returned to the second position at the collating station 74.

Figure 18:
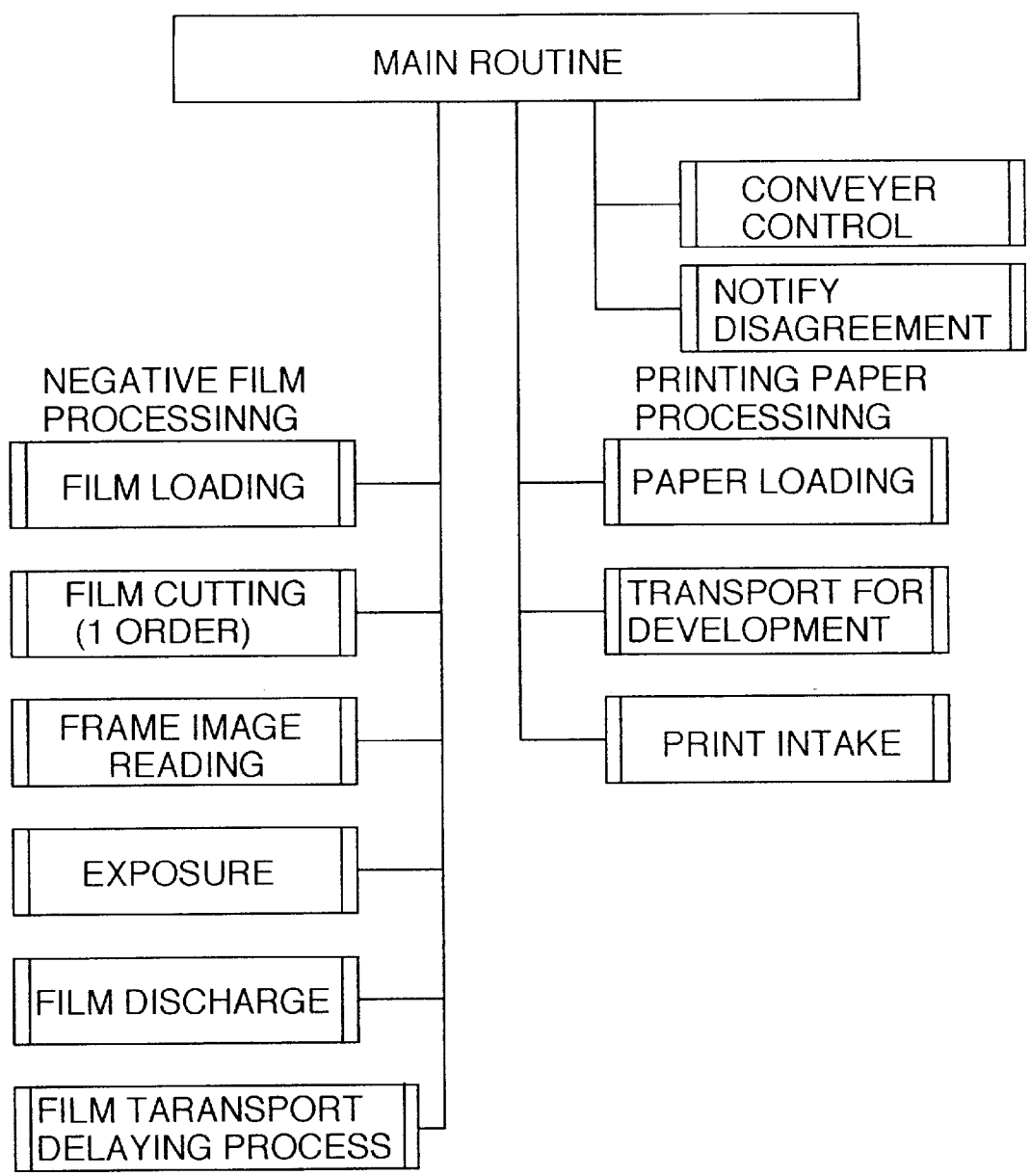
FIG. 18 is an explanatory view of functions of the controller.

Controls relating to the collation between negative films 2 and printing paper or prints 3 in the above photographic processing apparatus 1 will be described next. FIG. 4 shows, in block diagram, the controller 5 which controls the entire photographic processing apparatus 1. FIG. 18 shows the entire operation of the controller 5 in the form of a photograph processing apparatus controlling main routine. The photograph processing apparatus controlling main routine calls various processing routines to execute necessary processes. FIG. 18 shows, among such various processing routines, the routines relating to the collation in particular. In any case, the controller 5 is based on a microcomputer whose functions basically are provided in the form of programs, and may be illustrated in the two different forms consisting of the block diagram and processing routine flow chart.

Figure 19:
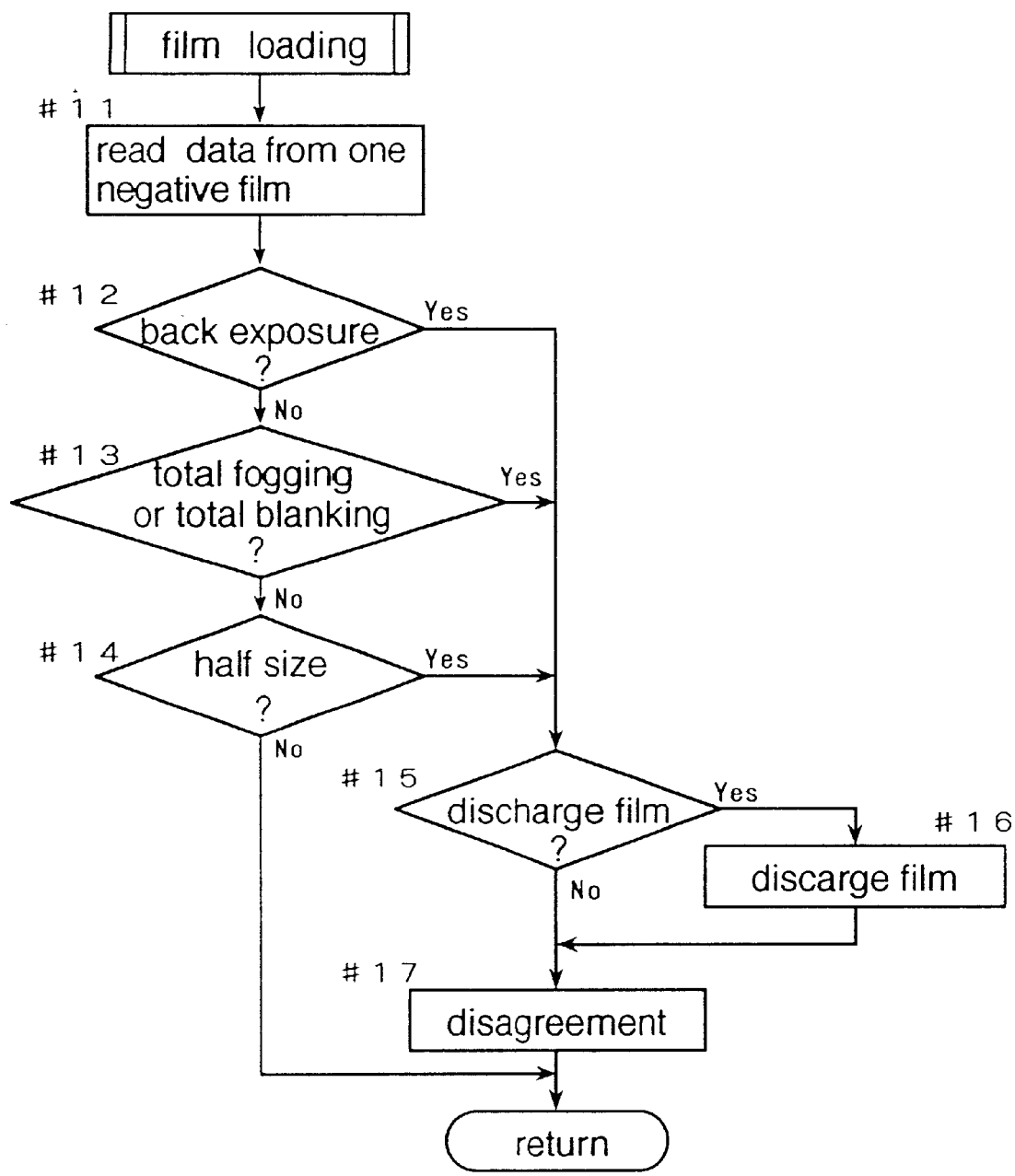
FIG. 19 is a flowchart of a negative loading process.

First, when the negative reel or reels 11 is/are set, a film loading routine is started. In the film loading processing routine, as shown in FIG. 19, the optical sensor reads data of one length (usually corresponding to one order) of negative film 2 (#11). It is determined whether a normal printing process is possible or not. That is, checking is made whether the frame images on this negative film 2 show back exposure (#12), total fogging or total blanking (#13) or whether they are half size instead of being full size (#14). In the case of "yes", a selection is made as to whether the negative film 2 inappropriate to such a printing process should be discharged forcibly, or should be forwarded to the negative film outlet 60 to be transferred to a tray 100 (#15). When the former is selected, this negative film 2 is discharged to a discharge negative box through a midway discharge line, not shown, based on a forcible discharge routine (#16). In any case, when the frame images are inappropriate to the printing process, it is determined to be a trouble of disagreement and trouble information is linked to the ID code of this negative film 2 (#17).

Then, a film cutting routine is executed to cut the negative film 2 after the film loading to a unit length corresponding to one order. The separated negative film 2 is forwarded to the exposing section 20.

Figure 20:
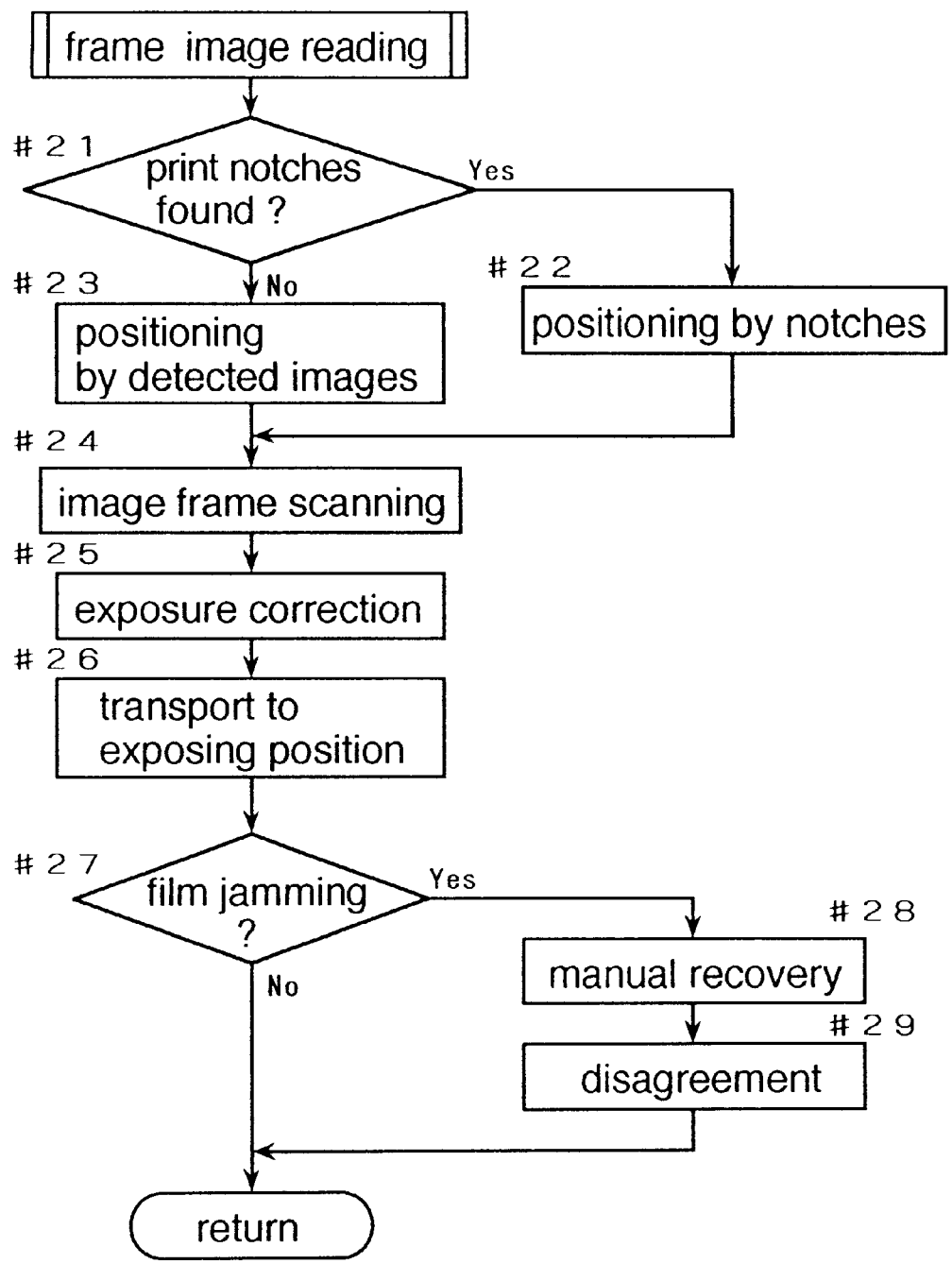
FIG. 20 is a flowchart of a frame image reading process.

The negative film 2 forwarded to the exposing section 20 undergoes a frame image reading routine shown in FIG. 20, which is executed prior to exposure. In the frame image reading routine, it is checked whether the negative film 2 has print notches for use in positioning the frame images (#21). If print notches are found, the frame images are positioned for scanning, by using the print notches (#22). In the absence of print notches, a predetermined frame image is set to scan position while detecting the frame images (#23). The film reader 21 reads image information from the frame images to set to position (#24). The image information is stored in an image memory in the controllers 5, and displayed on the monitor 6a after appropriate image processing. An exposure correction is made to the frame images read, as necessary (#25), and the negative film 2 is fed to the exposing position (#26). Checking is made whether a film jam has taken place in the course of this film feeding (#27). In the event of a film jam, the negative film 2 is removed by hand (#28). It is determined to be a trouble of disagreement and trouble information is linked to the ID code of the negative film 2 (#29). The negative film 2 removed is fed to the transport line again after all the negative films rolled on the negative reel 11 are processed.

Figure 21:
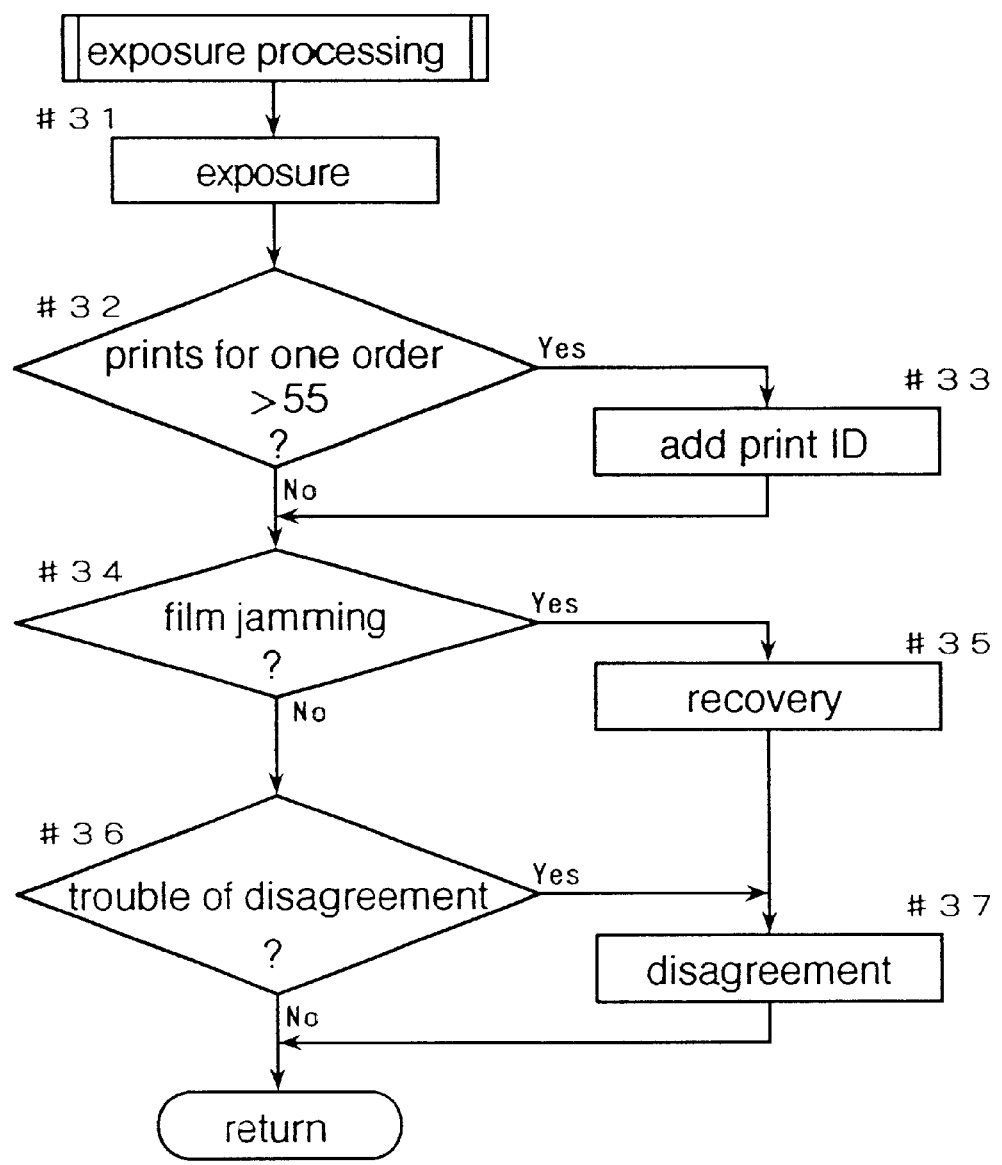
FIG. 21 is a flowchart of an exposing process.

In the exposing process, it is necessary to control the operation of each component of the exposing unit 22 as noted hereinbefore. The exposure processing routine shown in FIG. 21 is limited to movement of the negative film 2. In the exposure processing routine, the frame images of negative film 2 are successively exposed to printing 3 (#31). Because of a large number of prints made from each frame image, the number of prints for one order may exceed 55 (#32). Then, the value of print ID is incremented (#33). This print ID usually is affixed to all the prints for one order. By loading negative films 2 and prints 3 in one order into the same tray 100, the order number, negative film ID, print ID and tray ID are linked on one-to-one basis. However, in this embodiment, the number of prints to be placed on one tray 100 is limited to 55. An additional print ID is allocated to any prints 3 beyond 55. That is, two (or more as the case may be) prints IDs are given to one order. As a result, the one-to-one relationship is maintain for the print ID and tray ID. Subsequently, checking is made whether a film jam has taken place in the film feeding in the auto negative mask region (#34). In the event of a film jam, feeding of new negative films 2 to the auto negative mask is stopped once, and a manual recovery operation is carried out to remove the negative film 2 by hand. It is then determined that a trouble of disagreement has occurred, and trouble information is linked to the ID code of this negative film 2 (#35). The negative film 2 removed is fed to the transport line again after all the negative films rolled on the negative reel 11 are processed. When "no" results from step #34, a further checking is made whether a trouble of disagreement has occurred which requires removal of the negative film the photographic processing apparatus (#36). In the event of a trouble of disagreement, trouble information is linked to the ID code of the negative film 2 (#37). Thereafter, an exposing operation is carried out for one order as described hereinbefore.

Figure 22:
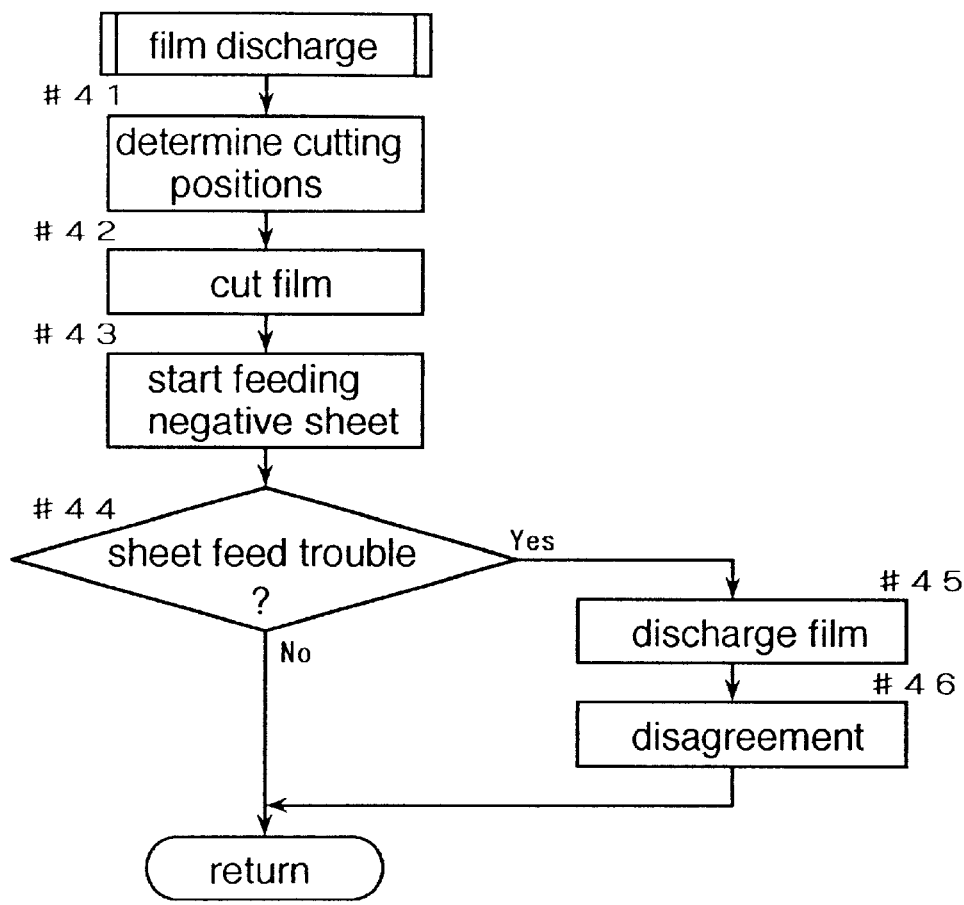
FIG. 22 is a flowchart of a negative discharge process.

The negative film 2 having undergone the exposing process is cut into negative pieces of predetermined length (each having four or six frames). The cut negative films (negative pieces) are inserted into negative sheet, and discharged from the negative film outlet 60. These processes are carried out according to a film discharge routine. In the film discharge routine shown in FIG. 22, parts of the negative film 2 to be cut are positioned to a cutting line of negative cutter 25 (#41). Then, the negative cutter 25 is operated to produce negative films 2 of predetermined length (#42). The cut negative films 2 are inserted into negative sheet by a negative sheet feeder which is known per se (#43). A trouble may occur in the course of sheet feeding which makes the feeding impossible (#44). This may be due, for example, to the negative sheet being too large or too small to fold, or to seams in the negative sheet obstructing the feeding. Then, the negative films 2 are discharged forcibly (#45), abandoning the attempt to place the negative pieces 2 on tray 100. Thus, trouble information is linked to the ID code of the negative films 2 (#46).

Figure 23:
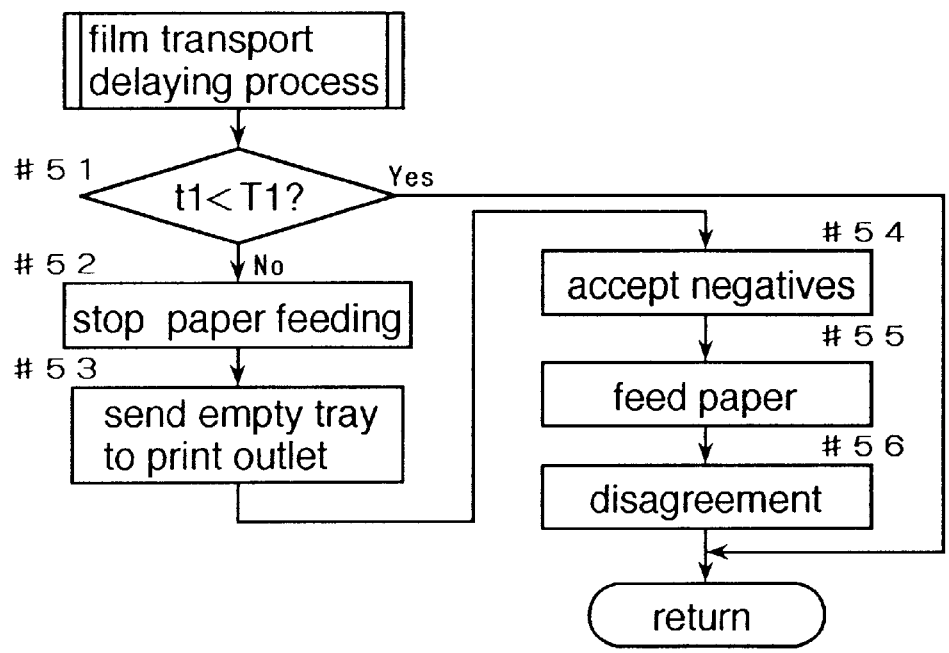
FIG. 23 is a flowchart of a negative transport delaying process.

If an excessively long processing time is taken in the exposing section 20 from completion of exposure of a final frame image to discharge through the negative film outlet 60, the tray 100 loaded with the negative films 2 in negative sheet discharged from the negative film outlet 60 usually fails to arrive at the print intake station 73 by the time the print 3 having the final frame image developed is discharged from the print outlet 50. A film transport delaying routine is provided to cope with such a situation. In the film transport delaying routine shown in FIG. 23, checking is made whether time t1 elaspsed from discharge from the developing section 30 of the print 3 having the final frame image on the negative film 2 is less than time limit T1 (#51). If time t1 exceeds time limit T1, the feeding of printing paper 3 to the exposing section 20 is discontinued (#52). To handle the prints 3 discharged from the print outlet 50 for the present, an empty tray 100 is sent off to the print outlet 50 (#53). Then, the negative films 2 from the negative film outlet 60 are loaded into a next tray 100 (#54), and the feeding of printing paper 3 is resumed (#55). At the same time, the negative films 2 present between the exposing section 20 and negative film outlet 60 are regarded as out of disagreement, and trouble information is linked to the ID code of these negative films 2 (#56). The negative film 2 set to the exposing section 20 is regarded as being in order.

Figure 24:
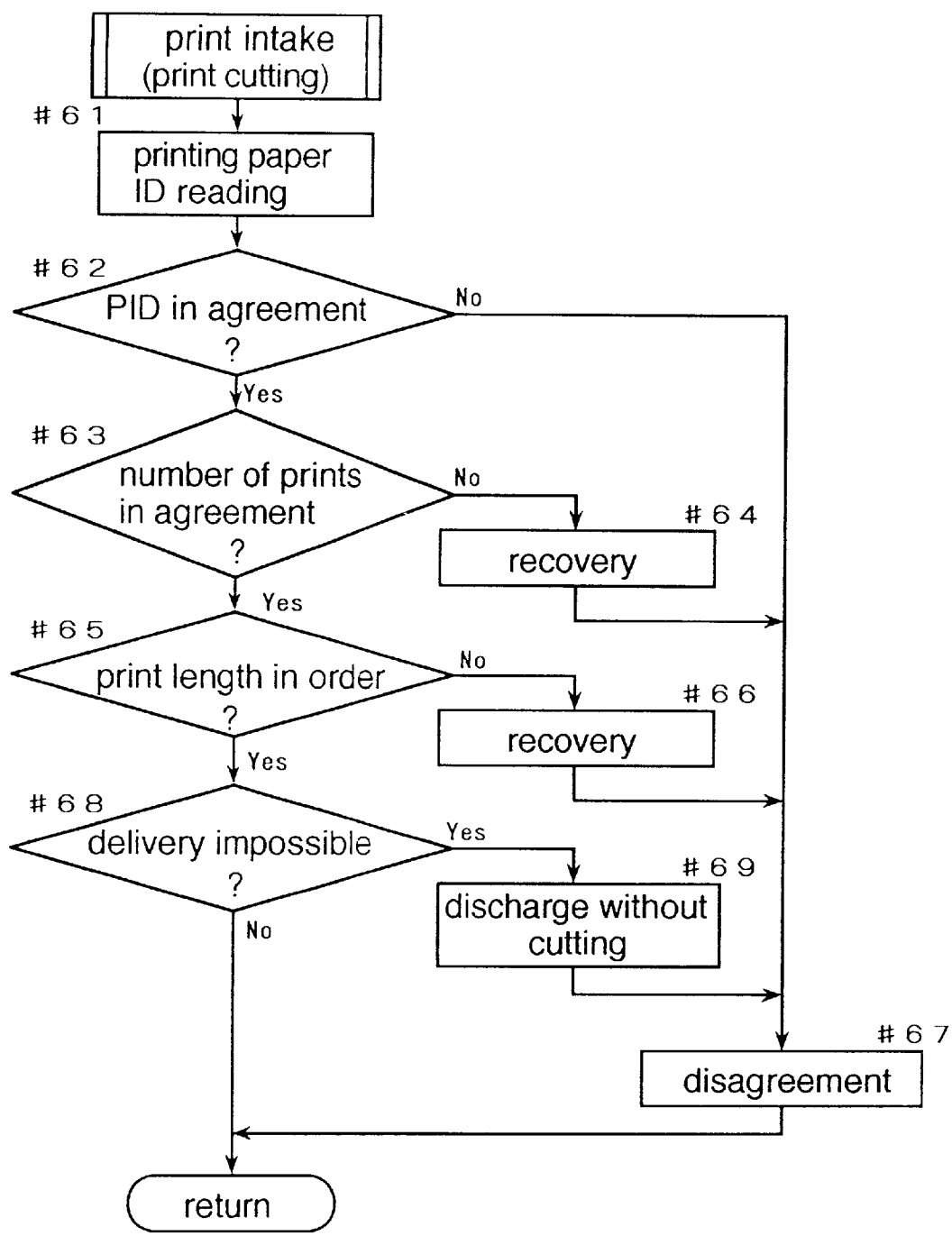
FIG. 24 is a flowchart of a print intake process.

The troubles of collating disagreement occurring in the processing related to the negative film 2 has been described hereinbefore. Such troubles of collating disagreement may take place also in the processing of printing paper 3 (and prints after cutting). However, no trouble of disagreement occurs up to the drying stage in the section since printing paper 3 is continuously processed after being fed to the exposing section 20 by the paper loading routine, developed by passing through the respective processing tanks in the developing station 30 by a developing section transport routine. The question arises with the step of loading a predetermined tray 100 with prints 3 cut from the printing paper 3. This processing routine is shown in FIG. 24. Prior to print cutting by the paper cutter 51, a row of notches formed in a side edge of printing paper 3 to represent a 6-bit print ID is read optically (#61). This print ID is checked to see if it agrees with the print ID stored in the form of link structure in the controller 5 (#62). In the event of disagreement, trouble information is linked to this print ID (#67). Further, the number of images exposed is checked against the number of prints cut from printing paper 3 by the paper cutter 51 (#63). As a result of this checking, the number of prints actually cut for this order by the paper cutter 51 may prove larger than the number of images exposed for this order, i.e. the number of prints stored in the controller 5 in time of the exposing process. In a recovery process executed in this case, these prints 3 are loaded into the tray 100 linked to these prints 3 for the present. The number of prints actually cut for this order by the paper cutter 51 may be smaller than the number of prints stored in the controller 5 for this order. In a recovery process executed in this case, a tray ID is added, when the number of prints stored in the controller 5 is reached, to prepare for a tray to be loaded with the remaining prints. In this embodiment, the number of prints stored in the controller 5 can be calculated by using the order notches dividing the printing paper 3 into units of orders. The frame images formed between the order notches correspond to the number of prints. Therefore, the above trouble is caused by an oversight in the (no order notch being detected even when a designated number of prints is reached) detection of the order notches or an excessive detection of the order notches (an order notch or notches are detected through a designated number of prints has been reached) in the region of paper cutter 51. In any case, if the number of prints is in disagreement, the recovery process relating to allocation of a tray 100 to be loaded is executed (#64). Subsequently, trouble information is linked to this print ID (#67). Further, a print length is checked here (#65). When a predetermined length is exceeded, a recovery is executed to cut Subsequently, trouble information is linked to this print ID prints 3 to a length for loading into the tray 100 (#67). If a trouble occurs with the transport system or the like to make it to deliver prints 3 to the print intake station 73 (#68), the printing paper 3 is discharged through the bypass 54 without being cut (#69). Trouble information is linked to this print ID (#67). In this case, prints 3 are not loaded into a tray 100. The pertinent tray 100 loaded only with negative films 2 is forwarded to the collating station 74.

Trouble information may be linked to the ID codes of negative films 2 carried and prints 3 to be carried by a tray 100 having stopped at the print intake station 73. Thus, the trouble information is linked also to the ID code of this tray 100. Then, a disagreement notifying routine is executed to operate the mark displaying solenoid 89 to display the red mark. This notifies the operator that the negative films 2 and prints 3 for this tray are a mismatch.

Next, an operation of the conveyer mechanism 70 to transport the trays 100 based on a conveyer mechanism control routine will be described.

In the negative film intake station 71, negative films 2 inserted in negative sheet folded, bare negative films 2, or negative films 2 in cartridges for advanced photo systems, delivered from the negative outlet 60 are automatically deposited unit by unit by a feeder not shown, in the film holders 150a of trays 100 stopped by the first stopper 85. The trays 100 released by the first stopper 85 in the negative film intake station 71 descend by gravity, and then run along an upward slope in engagement with the hitches 95 of the third drive unit 90c. The trays 100 are passed on to the first drive unit 90a forming the standby station 72, and are successively stored.

The leading tray 100 stored at the standby station 72 is engaged by a hitch 95 of the chain 91 of the fourth drive unit 90d in intermittent operation, to move up the steep slope in stages corresponding to the intervals between the hitches 95. The fourth drive unit 90d transports the trays 100 in stages corresponding to the intervals between the hitches 95 in interlocked relationship to the release of trays 100 by the second stopper 86 at the print intake station 73. Thus, when each tray 100 stopping at the print intake station 73 receives prints 3 in one unit from the transverse conveyer 53 and is moved down the slope by the fifth drive unit 90e, the next tray 100 is forwarded to the print intake position and stopped by the second stopper 86.

As long as this photographic processing apparatus 1 operates normally, and unless the number of prints in one order exceeds a predetermined amount, negative films 2 are deposited in the trays 100 unit by unit in the order of exposure in the exposing section 20. no tray 100 empty of negative films 2 receives prints 3. By receiving prints from the transverse conveyer 53 in the order of exposure, the film holder 150a of each tray 100 stores the prints 3 of the images of negative films 2 stored in the print holder 150b. When the number of prints in an order exceeds a predetermined amount, a further tray 100 is allocated to the excess prints. Apart from such exceptional cases, some trouble may result in a loss of certain of the negative films 2 and prints 3 stored in a tray 100 having a predetermined ID. This is recognized by the controller 5 as a disagreement. Then, the mark displaying solenoid 88 disposed at the print intake station 73 operates to rotate the drum 182 of collating mark display 180 to the first position to set the red indicative of the disagreement to the display bore 184b. The second stopper 86 releases the trays 100 having received from the transverse conveyer 53 the prints 3 to be combined with the negative films 2 in one unit. The tray 100 descends a little by gravity into engagement with a hitch 95 of the fifth drive unit 90e, and moves downward with movement of the chain 91. The fifth drive unit 90e is switchable between intermittent drive for transporting each tray 100 in stages corresponding to the intervals between the hitches 95 in interlocked relationship to the operation of the second stopper 86 according, for example, to the number of trays 100 stored at the collating station 74, and normal drive for transporting the trays 100 regardless of a state of the second stopper 86. The trays 100 driven downward by the fifth drive unit 90e enter the storage line of collating station 74 to be passed on to the sixth drive unit 90f once.

The tray 100 having entered the storage line of collating station 74 are stopped in order following the tray 100 stopped by the third stopper 87, to wait for the operator to collect negative films 2 and prints 3 from the trays 100 as finished products. The operator undertakes a predetermined recovery operation for a tray 100 displaying the red disagreement mark. In any case, the trays 100 having the negative films 2 and prints 3 removed therefrom by the operator are forwarded to the fourth stopper 88. This is done by the third stopper 87 operating in interlocked relationship to the second drive unit 90b transporting the trays 100 from the fourth stopper 88 to negative film intake station 71. In response to this operation, the first drive unit 90a advances the trays 100 one by one on the storage line.

The second drive device 90b transports each tray 100 released by the fourth stopper 88 to the negative film intake station 71 upon completion of loading of negative films 2 into the film holder 150a of tray 100 maintained in the stop position by the first stopper 85. That is, when the first stopper 85 releases the tray 100 loaded with negative films 2, the fourth stopper 88 releases the next tray 100 provided that the completion of removal of negative films 2 and prints 3 is detected by the optical sensor 76 disposed in the area of the fourth stopper 88. The empty tray 100 is fed to the negative film intake station 71. In response thereto, the third stopper 87 also releases a tray 100, whereby the tray 100 is forwarded to the fourth stopper 88.

In the above photographic processing apparatus, the printing paper 3 having the frame images of negative film 2 printed thereon is developed, cut to prints, and transported to the collating station 74. The printing paper 3 passing through the developing tanks in the developing section 30 cannot be stopped even when the conveyer mechanism 70 is not operated in a normal way in the event of a trouble in the intake station 73 or an overflow in the collating operation at the collating station 74. The printing paper 3 is cut as it is to prints, and discharged through the print outlet 50. The prints overflowing the print intake station 73 could mix with the prints in a preceding order. Thus, a trouble could occur to cause collating disagreement for a considerable number of orders. A technique of executing a necessary process in anticipation of such a trouble will be described hereinafter.

The trays 100 stopping at the negative film intake station 71 and print intake station 73 are confirmed by the ID sensors 77a and 77b. The number of trays present between the tray stopping position at the negative film intake station 71 and the tray stopping position at the print intake station 73 can be accurately calculated. This calculation is done by a delay anticipating unit 5m of the controller 5 for anticipating a delay in arrival of the tray at the print intake station. In this embodiment, the number of trays 100 present between the tray stopping position at the negative film intake station 71 and the tray stopping position at the print intake station 73 is set a predetermined number 25. When the number of trays present between the negative film intake station 71 and print intake station 73 reaches 25, s succeeding tray 100 cannot be forwarded. The frame images on the printing paper 3 to be loaded into this tray 100 is stopped being sent to the developing section 30. The number of trays acceptable to the conveyer mechanism 70 is determined from the collating capacity of the photographic processing apparatus 1. This is the number of trays 100 loaded with negative films 2 and prints 3 and forwarded to the collating station 74 by the conveyer mechanism 70 before the frame images on printing paper 3 having entered the developing section 30 are developed, cut and delivered to the print intake station 73. The number of trays 100 present between the tray stopping position at the negative film intake station 71 and the tray stopping position at the print intake station 73 reaches 25 as a result of a trouble with the transport of trays 100. Apart from this, even if the photographic processing apparatus 1 operates normally, the predetermined number 25 is reached soon in the case of a small number of prints in each order, requiring a large number trays 100. In any case, when the number of trays present between the negative film intake station 71 and print intake station 73 reaches 25, a delay occurs in the arrival at the print intake station 73 of the tray 100 for loading prints 3 having the frame images of negative films 2. With the tray 100 failing to arrive for loading the prints 3 delivered by the transverse conveyer 54, the prints 3 mix with the prints 3 in a different order.

When the delay anticipating unit 5m determines the number of trays present between the tray stopping position at the negative film intake station 71 and the tray stopping position at the print intake station 73 to be 25, a delay is expected of arrival at the print intake station 73 of the next tray 100 loaded with negative films 2. Then, the delay anticipating unit 5m gives an instruction to an emergency cutter control unit 5n, whereby the emergency cutter control unit 5n operates the emergency cutter 27 to cut printing paper 3 at a division notch 3b. As a result, the printing paper 3 is stopped being fed to the developing section 30.

Further, the delay anticipating unit 5m checks, based on the signal received from the optical sensor 76, whether the tray 100 standing by to be forwarded to the negative film intake station 73, i.e. the tray stopped by the fourth stopper 88, is empty or not. If this tray 100 is not empty, it means that there is no tray for loading negative films 2 at the negative film intake station 71. This would result in no timely arrival at the print intake station 73 of a tray for loading the prints 3 having the frame images of these negative films 2. Therefore, the printing paper 3 printed with the frame images is stopped being fed to the developing station 30. If it is determined that no empty tray 100 is available because of an interruption of the collating operation due to some trouble, the trays 100 cannot be forwarded from the print intake station 73 to the collating station 74 since there is a limit to the number of trays storable at the collating station 74. Consequently, loading of prints 3 into the trays 100 is expected to come to a standstill, which requires the printing paper 3 to be stopped being fed to the developing section 30. Thus, as noted above, the delay anticipating unit 5m gives an instruction to the emergency cutter control unit 5n, whereby the emergency cuter control unit 5n operates the emergency cutter 27 to cut the printing paper 3 at a division notch 3b. As a result, the printing paper 3 is stopped being fed to the developing section 30.

That is, the photographic processing apparatus having this delay anticipating unit anticipates all causes of a delay in arrival which may occur in the process from the print outlet 50 to shipment after the collating operation. When such a delay is expected, the printing paper 3 is stopped being fed to the developing section 30.

In the foregoing embodiment, the construction is employed to display a color as a notifying means to notify that negative films 2 and prints 3 to be loaded into a tray 100 have a trouble of collating disagreement. In other embodiments of this invention, it is also possible to employ a notifying device for displaying a different mark or lighting a lamp to appeal to vision, or a notifying device in the form of a buzzer as an auditory signal.

What is claimed is:

1. A photographic processing apparatus having an exposing section for printing images of negative films received from a negative film feeder on printing paper, a negative film outlet for discharging the negative films used in the exposing section, a developing section for developing the printing paper printed and a print outlet for cutting the printing paper developed to predetermined lengths and discharging the cut printing paper as prints, said photographic processing apparatus comprising:

collating transport means for receiving the negative films discharged unit by unit from the negative film outlet and the prints discharged unit by unit from the print outlet and having the images of the negative films in corresponding units, and combining and transporting the negative films and prints as finished products, wherein said collating transport means is a tray conveyor;

trouble detecting means for detecting a trouble of collating disagreement occurring during processing said negative films and said printing paper to affect collation between said negative films and said print paper in one unit; and notifying means operable in response to trouble information provided by said trouble detecting means for notifying that said finished products transported by said collating transport means have said trouble of collating disagreement, wherein each tray is constructed to store said finished products and has said notifying means.

2. A photographic processing apparatus as defined in claim 1, wherein said notifying means is operable for selectively displaying a visually recognizable collating disagreement mark.

3. A photographic processing apparatus as defined in claim 1, wherein each tray includes a film holder for storing said negative films, and a print holder for storing said prints, said prints having the images of said negative films stored in said film holder being stored in said print holder of the same tray.

4. A photographic processing apparatus as defined in claim 1, wherein said trouble detecting means detects said trouble of collating disagreement as a result of a disruption in continuous processing of said negative films or said printing paper.

5. A photographic processing apparatus as defined in claim 1, wherein said trouble detecting means detects said trouble of collating disagreement as a result of all images on said negative films being found unsuitable to a normal printing process.

6. A photographic processing apparatus having an exposing section for printing images of negative films received from a negative film feeder on printing paper, a negative film outlet for discharging the negative films used in the exposing section, a developing section for developing the printing paper printed, and a print outlet for cutting the printing paper developed to predetermined lengths, and discharging the cut printing paper as prints, said photographic processing apparatus comprising:

a tray conveyer for receiving said negative films discharged unit by unit from said negative film outlet and said prints discharged unit by unit from said print outlet and having the images of said negative films in corresponding units, and combining and transporting said negative films and said prints as finished products; and delay anticipating means for anticipating a delay in arrival of a tray transported from a negative film intake station where said negative films are transferred from said negative film outlet to said tray, to a print intake station where said prints are transferred from said print outlet to said tray, wherein feeding of said printing paper to said developing section is discontinued when said delay anticipating means anticipates a delay in arrival of said tray at said print intake station.

7. A photographic processing apparatus as defined in claim 6, wherein said tray includes a film holder for storing said negative films, and a print holder for storing said prints, said delay anticipating means anticipating said delay in arrival when the number of trays present between said negative film intake station and said print intake station reaches a predetermined number.

8. A photographic processing apparatus as defined in claim 7, wherein said delay anticipating means anticipates said delay in arrival when one of trays stored at a collating station for collating said negative films and said prints carried by said tray, nearest to said negative film intake station is loaded.

9. A photographic processing apparatus as defined in claim 6, wherein feeding of said printing paper to said developing section is discontinued by cutting said printing paper prior to arrival at said developing section.

10. A photographic processing apparatus as defined in claim 9, wherein said printing paper is cut in a position thereof between adjacent units.

* * * * *

UNITED STATES PATENT AND TRADEMARK OFFICE
CERTIFICATE OF CORRECTION

PATENT NO. : 6, 008, 878
DATED : December 28, 1999
INVENTOR(S) : Hinonori Masutani It is certified that error appears in the above-identified patent and that said Letters Patent is hereby corrected as shown below:

In column 7, line 23, change "cuter" to -- cutter --.
In column 7, line 62, change "11" to -- 111 --.
In column 13, line 46, after the word "printing" insert the word -- paper --.

In column 18, line 27, change "cuter" to -- cutter --.

Signed and Sealed this

Twentieth Day of February, 2001

Attest:

NICHOLAS P. GODICI

Attesting Officer        Acting Director of the United States Patent and Trademark Office